INVENTOR.
Clifford D. Ihrig
BY W. L. Stout
HIS ATTORNEY

INVENTOR.
Clifford D. Ihrig
BY W. L. Stout
HIS ATTORNEY

Sept. 27, 1960 C. D. IHRIG 2,954,463

CODED RAILWAY SIGNALING SYSTEMS EMPLOYING NORMALLY ENERGIZED REVERSIBLE TRACK CIRCUITS

Filed Sept. 7, 1954 18 Sheets-Sheet 4

CODED RAILWAY SIGNALING SYSTEMS EMPLOYING NORMALLY ENERGIZED REVERSIBLE TRACK CIRCUITS

Filed Sept. 7, 1954

INVENTOR.
Clifford D. Ihrig
BY
W. L. Stout.
HIS ATTORNEY

INVENTOR.
Clifford D. Ihrig
BY W. L. Stout.
HIS ATTORNEY

INVENTOR.
Clifford D. Ihrig
BY
W. L. Stout.
HIS ATTORNEY

INVENTOR.
Clifford D. Ihrig
BY
W. L. Stout.
HIS ATTORNEY

INVENTOR.
Clifford D. Ihrig
BY W. L. Stout.
HIS ATTORNEY

INVENTOR.
Clifford D. Ihrig.
BY W. L. Stout.
HIS ATTORNEY

Sept. 27, 1960 C. D. IHRIG 2,954,463

CODED RAILWAY SIGNALING SYSTEMS EMPLOYING NORMALLY ENERGIZED REVERSIBLE TRACK CIRCUITS

Filed Sept. 7, 1954 18 Sheets-Sheet 18

United States Patent Office 2,954,463

Patented Sept. 27, 1960

2,954,463

CODED RAILWAY SIGNALING SYSTEMS EMPLOYING NORMALLY ENERGIZED REVERSIBLE TRACK CIRCUITS

Clifford D. Ihrig, Penn Township, Allegheny County, Pa., assignor to Westinghouse Air Brake Company, Wilmerding, Pa., a corporation of Pennsylvania Filed Sept. 7, 1954, Ser. No. 454,251

5 Claims. (Cl. 246—3)

Figure 1A:
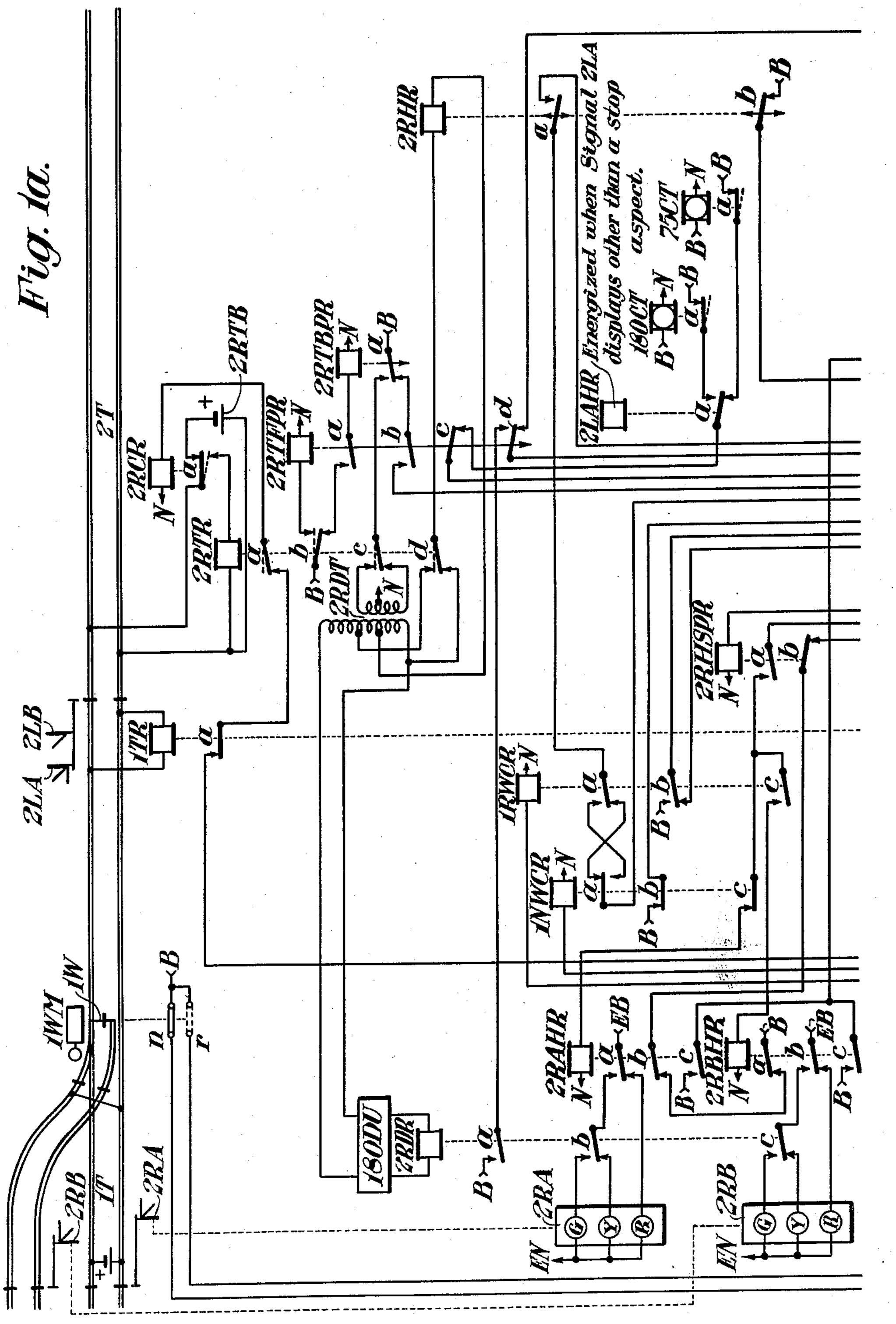
Figure 1B:
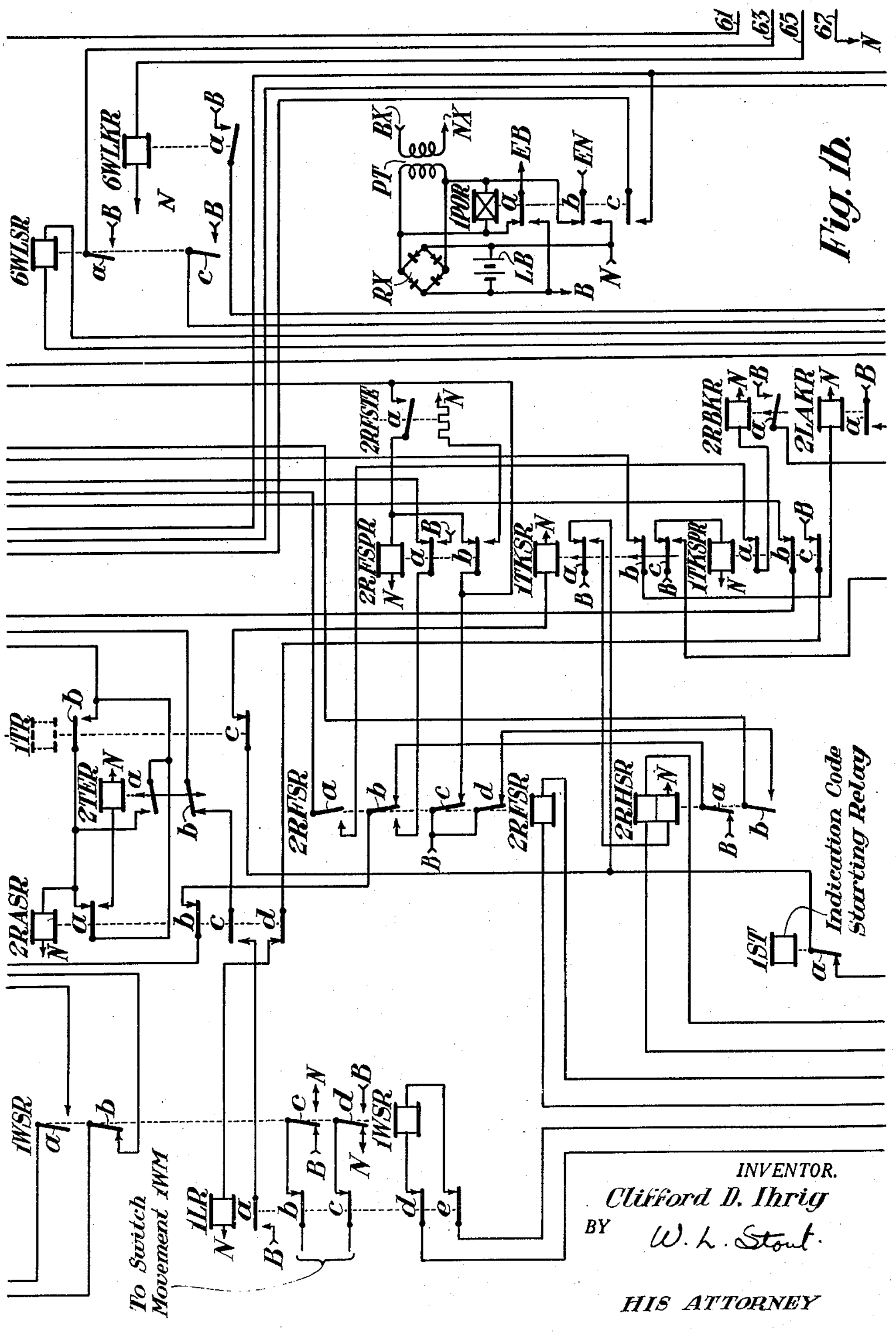
Figure 1C:
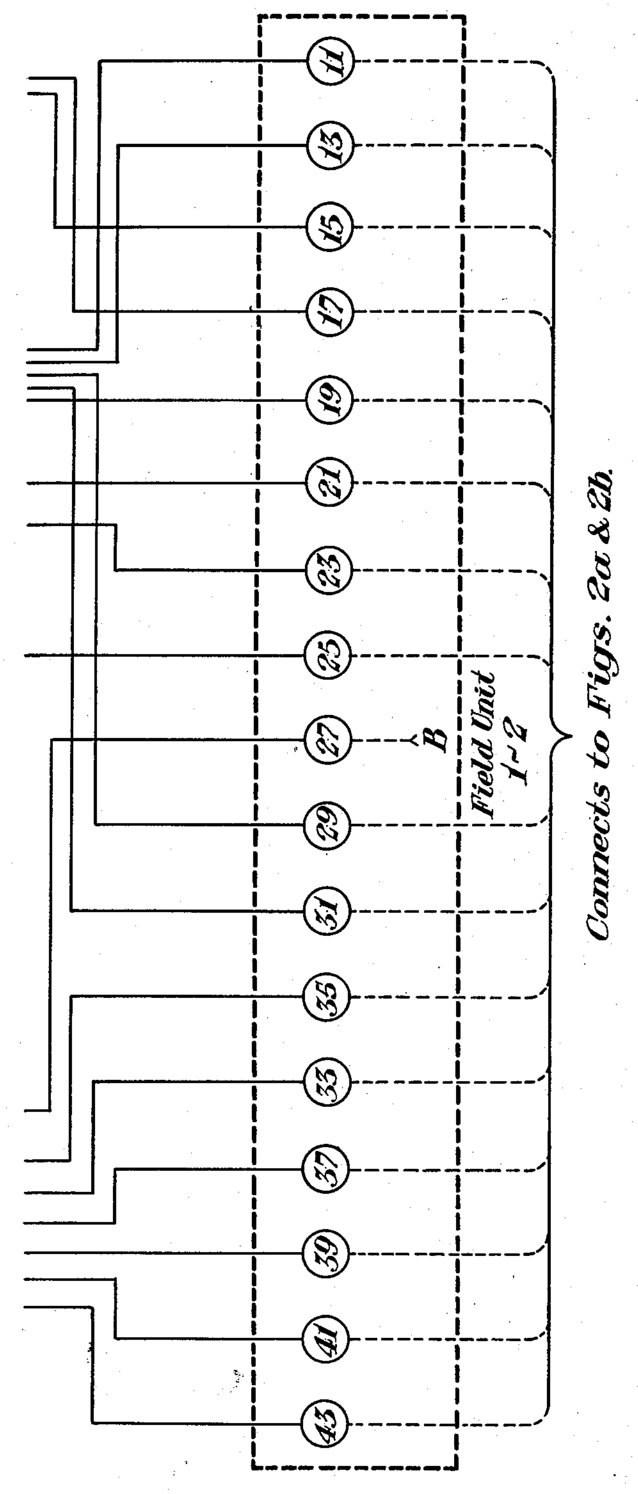
Figure 1D:
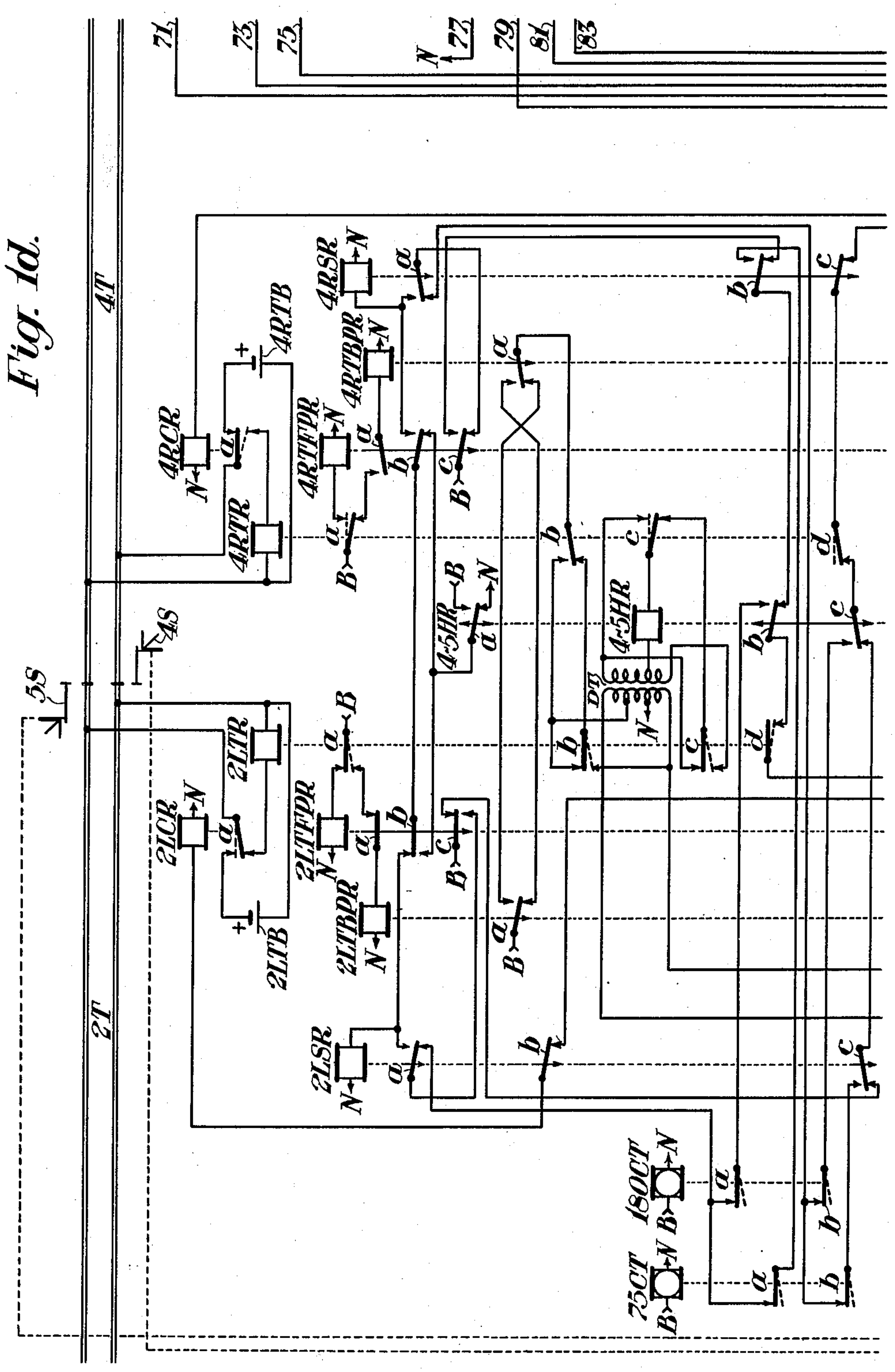
Figure 1E:
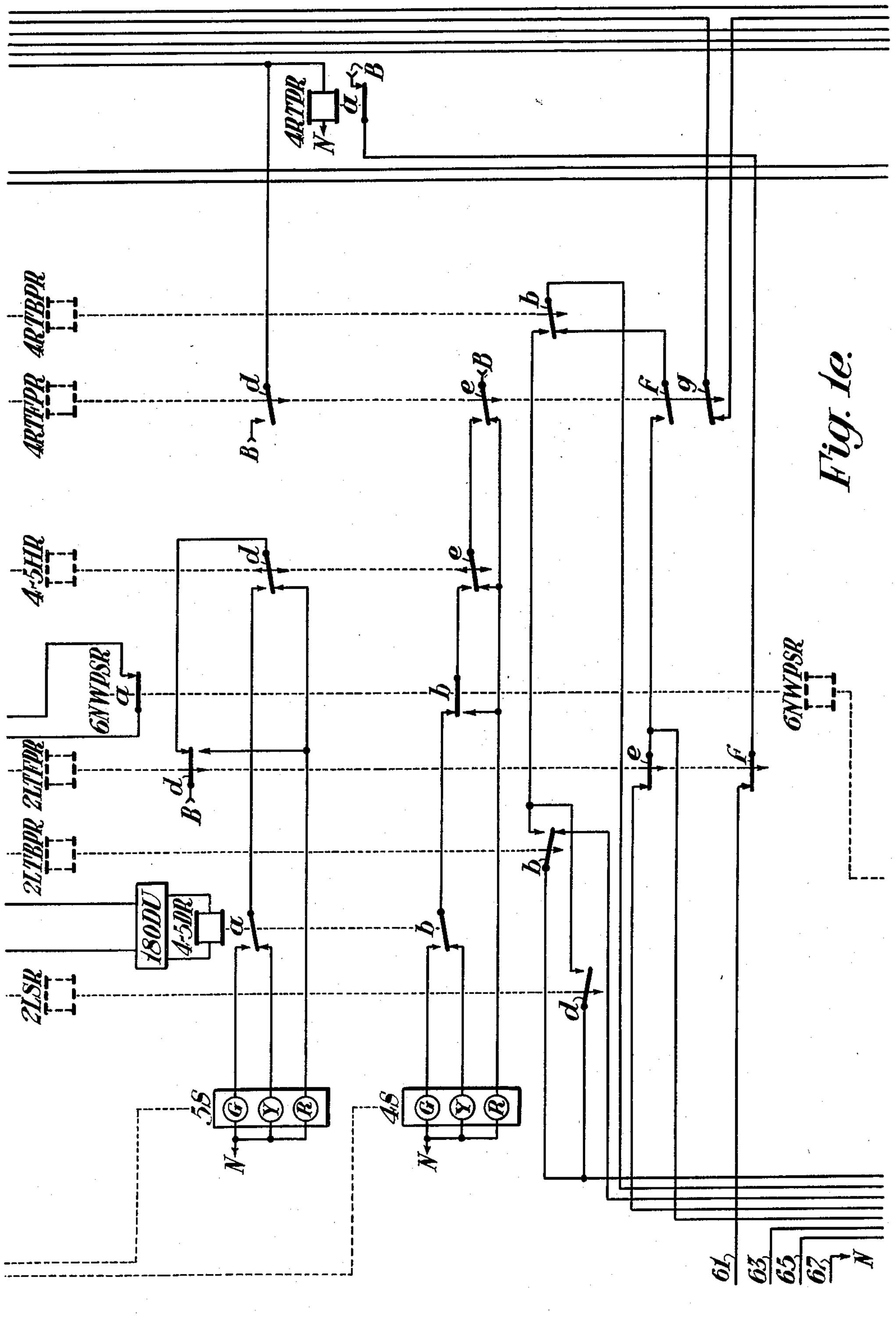
Figure 1F:
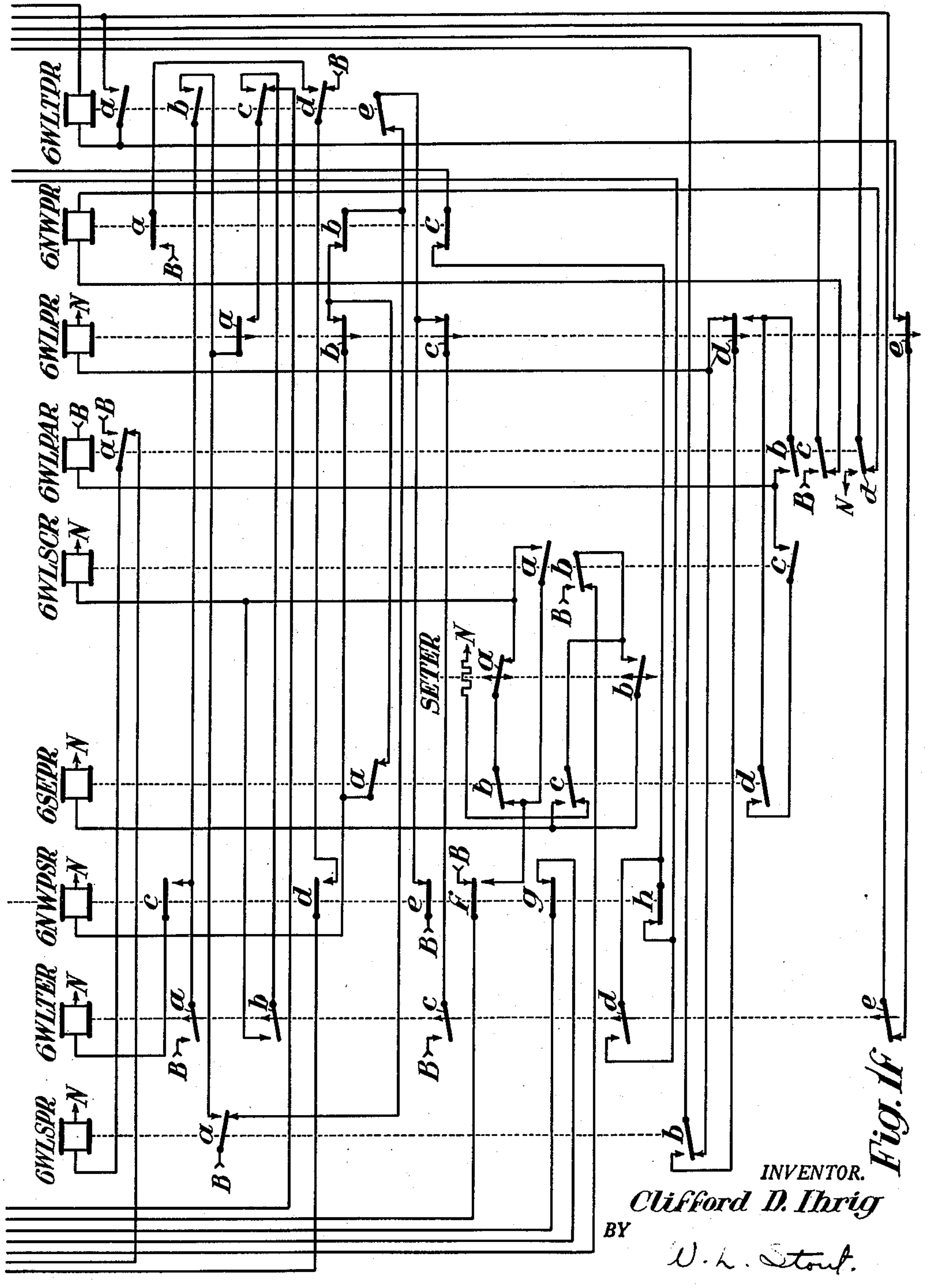
Figure 1G:
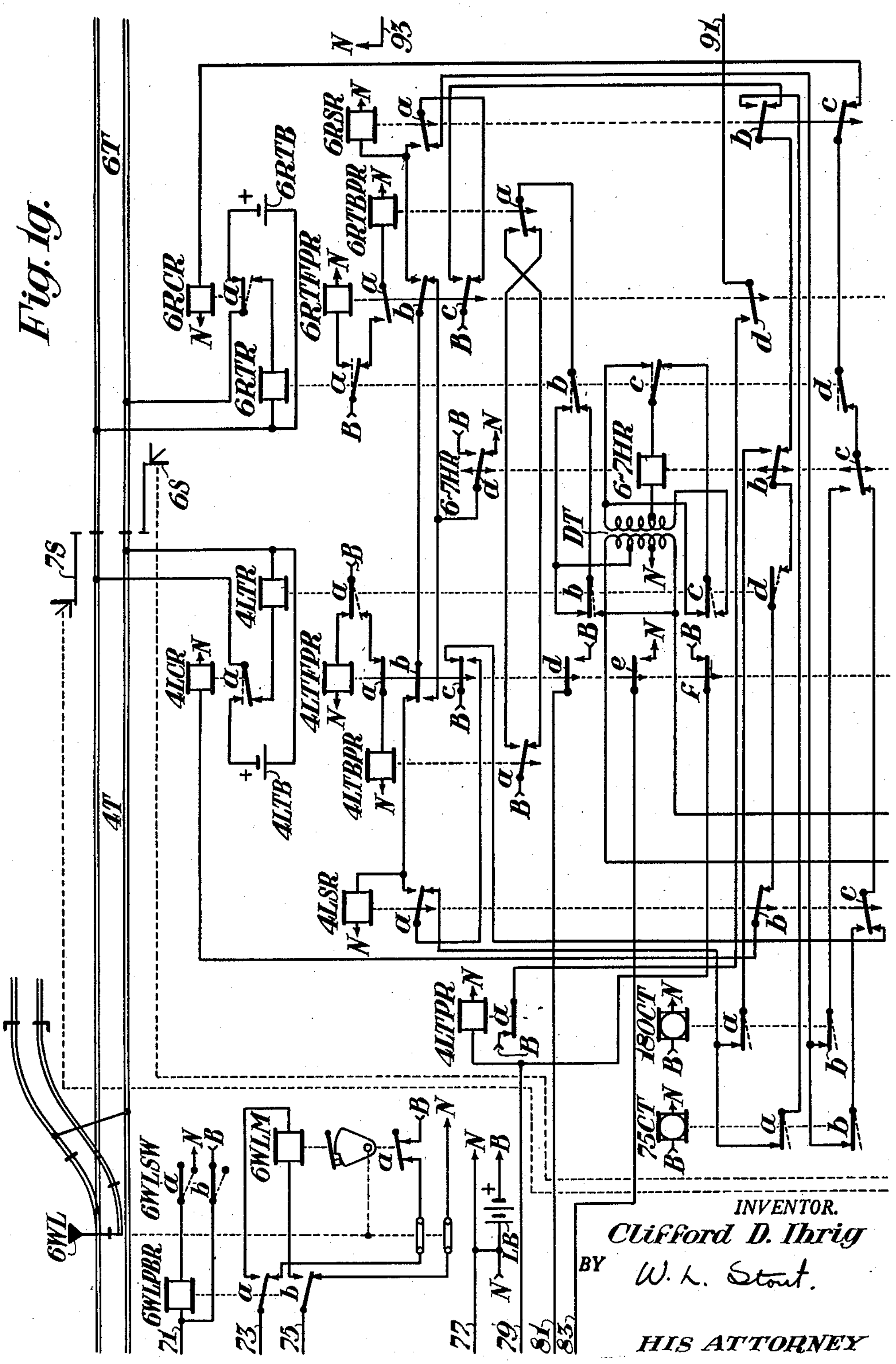
Figure 1H:
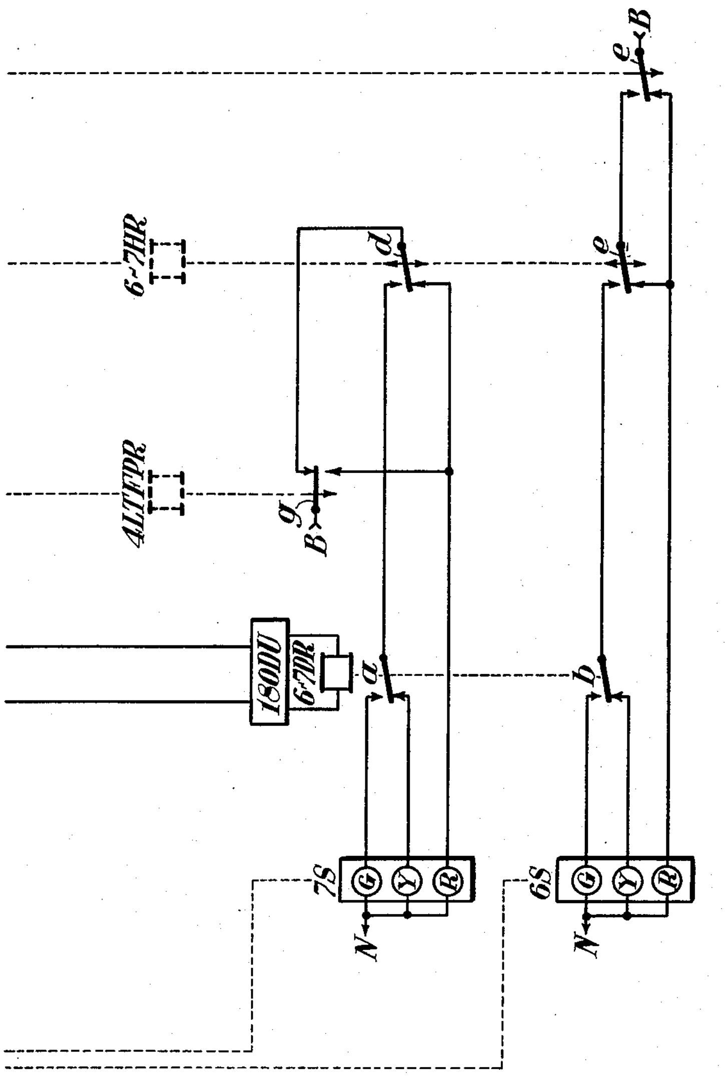
Figure 1K:
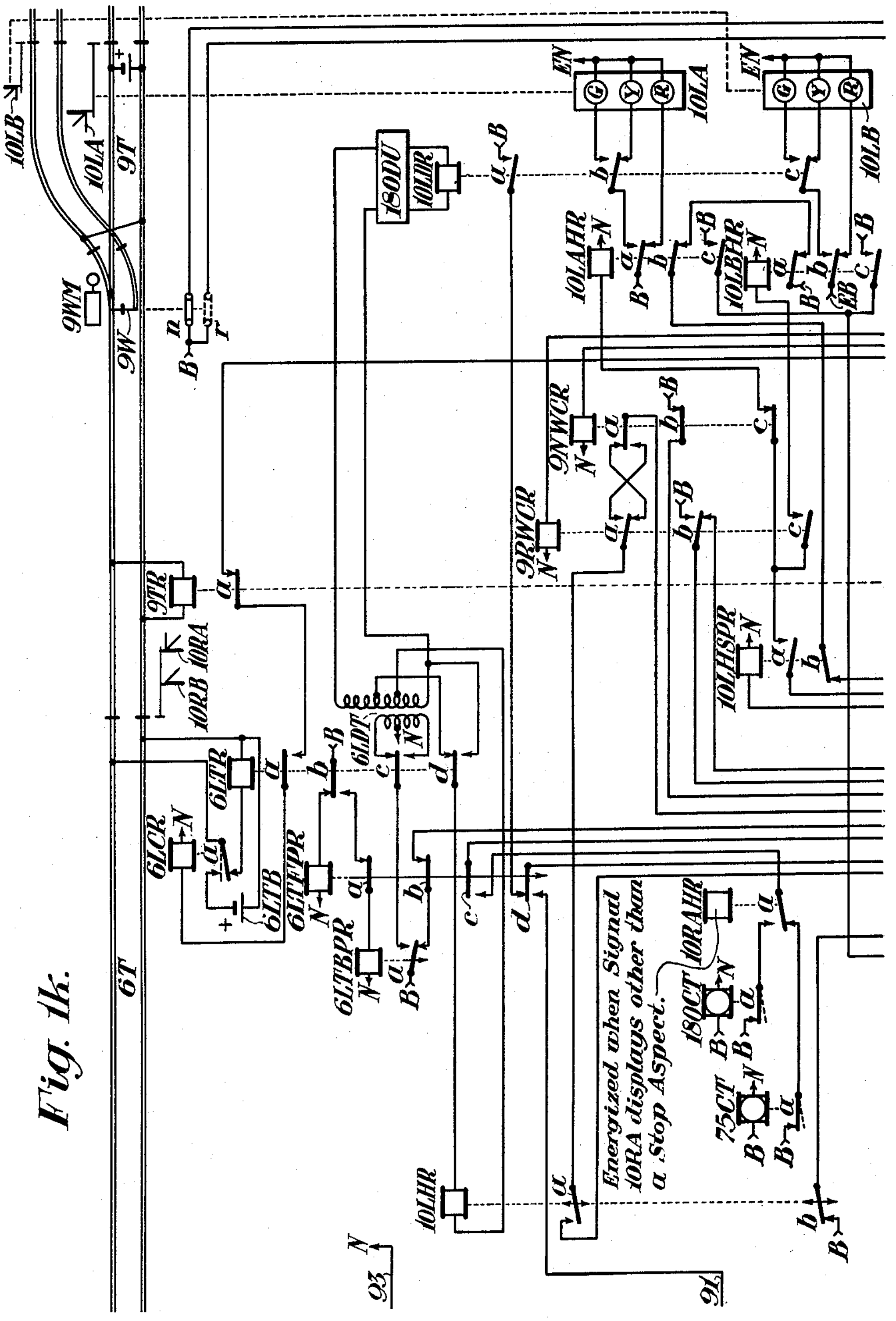
Figure 1M:
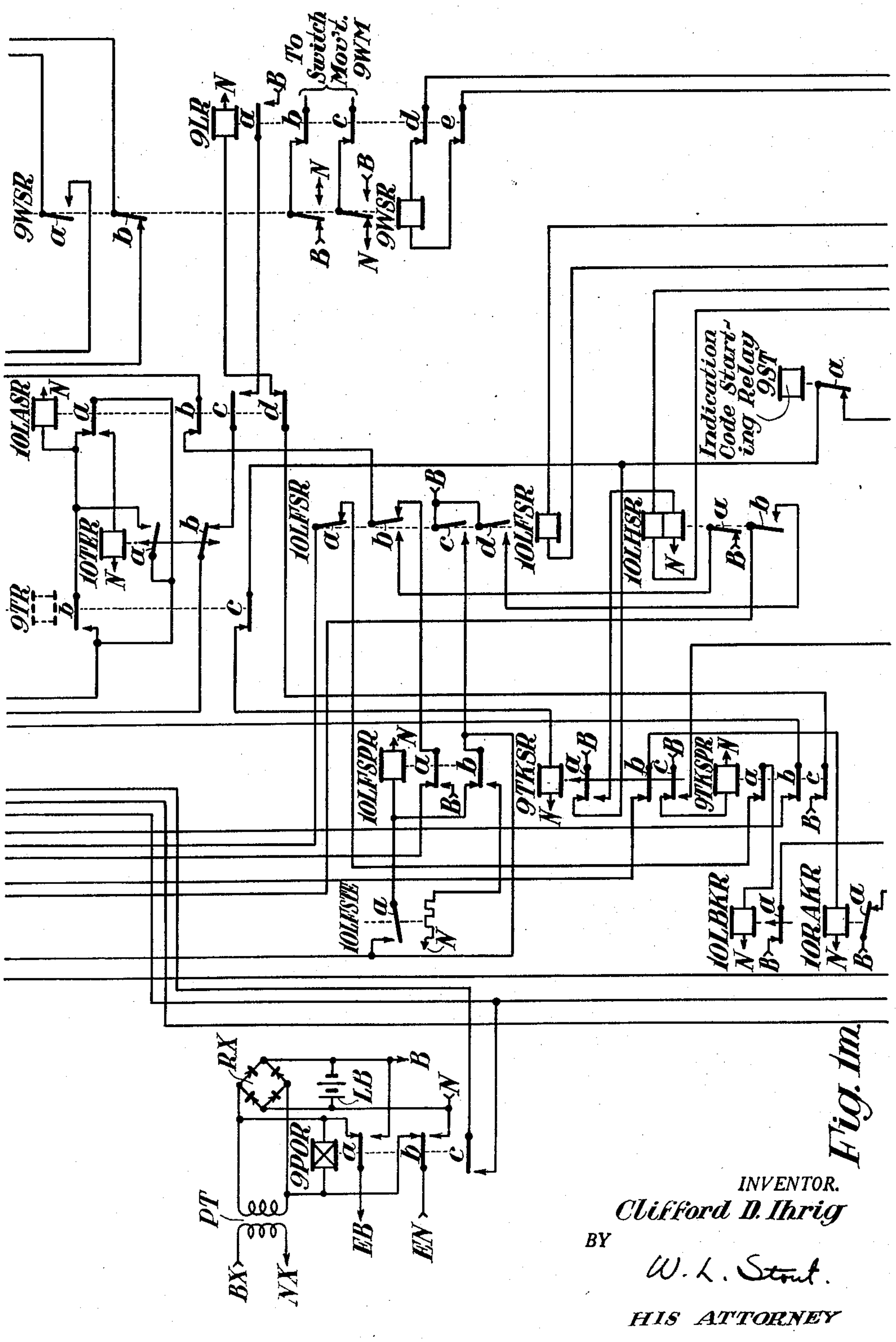

My invention relates to coded railway signaling systems, and particularly to a coded railway signaling system employing normally energized, reversible track circuits and of the type in which the movements of traffic through a stretch of railway track are directed from a centralized point, to provide what is commonly known as a centralized traffic control railway signaling system. My invention further relates to systems of the type described, in which a stretch of railway track is arranged in such manner that the track sections therein are normally energized with steady energy, this energy being changed to coded energy of a suitable type when a traffic movement is to be made therethrough.

In systems of this general type, as previously proposed, it has been the customary practice to provide a single block indication light on the control machine to indicate when a stretch of single track is occupied. Although this single block indication light will provide information to the control operator as to whether or not a particular single track stretch is occupied by a train, it does not provide information as to the relative progress of the train, such as would be accomplished by providing at least two block indication lights. It would be of considerable assistance to the operator to have two block occupancy lights in each single track stretch, each light indicating when at least one half of the single track stretch is occupied. Further assistance to the operator may be obtained if the portions of the stretch covered by each light overlap, so that at times both lights simultaneously indicate track occupancy.

In systems of this general type, provision is made for the control of hand-operated switches located at some point in the single track stretch between sidings, such hand-throw switches being governed by electric switch locks, which require the cooperation of the train crew and the control operator before the hand-throw switch can be unlocked to permit a train to enter or leave a side track at that point. In circuits heretofore used, where the unlocking control for a move through a hand-throw switch equipped with an electric switch lock has been obtained by providing a time interval following the entrance of a train into a track section in which the electrically locked switch is located, it has been necessary to provide conventional track circuits to obtain the timing operation. These conventional track circuits must then be by-passed with line wires arranged to carry coded energy around the conventional track circuit to provide coded operation for the remainder of the track sections in the stretch.

Moreover, in systems of this general type as previously proposed, the control of such switch locks has been accomplished by a number of line wire circuits extending from a control location to the switch lock location, since it is necessary to provide suitable indications to the control operator of the conditions at the hand-throw switch location. It is of course desirable to keep the number of line wires necessary for these control circuits to a minimum. It is even more desirable to eliminate the line wires which pass the coded track circuit around the conventional track circuits at the switch location, since these wires are more vulnerable to the elements and are thus more likely to cause track circuit failures which result in unnecessary delays to through trains. It would be highly advantageous to carry as many as possible of the controls and indications for the switch lock in the track circuits used for the basic signal system, eliminating entirely the short conventional track circuits and the by-pass line wires and requiring only short wire leads from the nearest intermediate signal for the majority of the controls and indications.

In remotely controlled signal systems of this type, it is frequently necessary for the operator to know when the primary source of power at a controlled location has failed. If this information is lacking, the continued use of the standby power source will result in its failure and consequent breakdown in operation of that controlled location. Frequently, in order to provide this single indication, considerable extra communication equipment is required to furnish one extra channel. At the same time, two regular indication channels are being used to carry indications from a three condition movable device such as a power switch. Since two channels can indicate four conditions, it would be advantageous if the condition of power failure may be indicated by using the blank fourth space available on the two channels used for the track switch.

Accordingly, an object of my invention is to provide a railway signaling system of the centralized traffic control type in which two block indication lamps for each single track stretch are provided on the control machine, in addition to the usual separate indication to provide suitable locking to prevent reversal of traffic at improper times.

Another object of my invention is to provide a system of the type described in which the control of electric switch locks located in the single track stretch is obtained by utilizing steady energy to check that the stretch is unoccupied by an opposing train and that no conflicting controlled signal is clear before a switch can be unlocked for a move therethrough from a side track. Thus, an unauthorized manipulation of the electric lock mechanism cannot disturb the signals for an established train movement.

A further object of my invention is to provide, in a system of the type described, means for supplying an indication to the control operator to cause the system to change the steady energy normally supplied to the single track stretch to coded energy to provide suitable approach locking for protection of the hand-throw switch.

Still a further object of my invention is the provision of a switch locking control circuit for entering moves into a siding, including a suitable time element means for timing the occupancy of the track section in which the switch lock is located.

Still a further object of my invention is to provide an improved arrangement for governing the control and indication of the electric switch locks in a single track stretch used in a system of the type described, in which a minimum number of line wires is employed between the main control point and the switch lock location, the circuits using a series type control to provide the necessary controls and indications so that two less wires are required over previous arrangements.

Still another object of my invention is to provide a novel arrangement of circuits in the control machine to provide means for sending a suitable control code to a field location when an indication is received at the control machine from the field location that the presence of steady energy at a switch lock location has been properly detected.

Still another object of my invention is to provide an improved arrangement for providing a power-off indication over the code communication system which is employed in railway signaling systems of this type, by utilizing the code indication steps which are normally used to provide indication of the position of a power operated switch located at the end of a passing siding.

Other objects, purposes, and characteristic features of my invention will be apparent from the following description taken in connection with the accompanying drawings.

In practicing the invention, I accomplish the foregoing and other objects by first providing suitable circuits associated with the single track stretch for checking the occupied or unoccupied condition of the track sections, which circuits are arranged to send suitable indications to the control machine for the control of two approach indication lamps on the control panels. The indication lamps are controlled in such manner that the lamps are normally dark, but are lighted over contacts of the indication relays, which are controlled by the circuits in the field, and also over contacts of block indication relays, so that the lamps are lighted only when a train is occupying the single track stretch and coded energy is being supplied thereto for the control of the signals. I further provide a suitable circuit at a switch lock location for checking the presence of steady energy in a single track stretch when a movement is to be made from the side track through a hand-throw switch controlled by an electric lock. These circuits are arranged so that the supply of steady energy is then cut off, and a suitable code is transmitted to the control machine, which then acts to govern the field controls in such manner that coded energy is transmitted from each end of the single track stretch to permit the unlocking of the hand-throw switch. I also provide a suitable time element relay and associated circuits for timing the occupancy of a track section in which the switch lock lies in order to permit a train on the main track to unlock the hand-throw switch for a move into the side track. Finally, I provide at each station suitable circuit means, associated with the switch indication relays and with a relay which indicates the condition of the power supply in the field, for sending indications to the control office on the code steps normally used for transmission of the switch position indication, and provide in the control machine suitable circuits for indicating a power-off condition and for retaining such an indication when the switch is reversed.

I shall describe one form of coded railway signaling system embodying my invention, and shall then point out the novel features thereof in claims.

Figure 3:
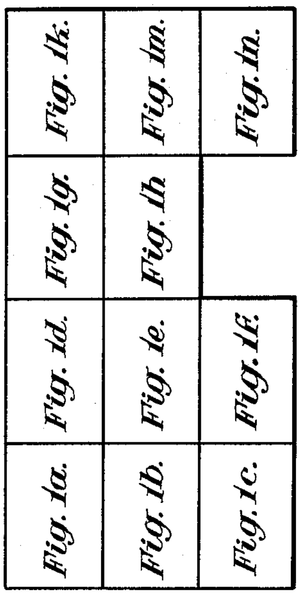
Figure 2A:
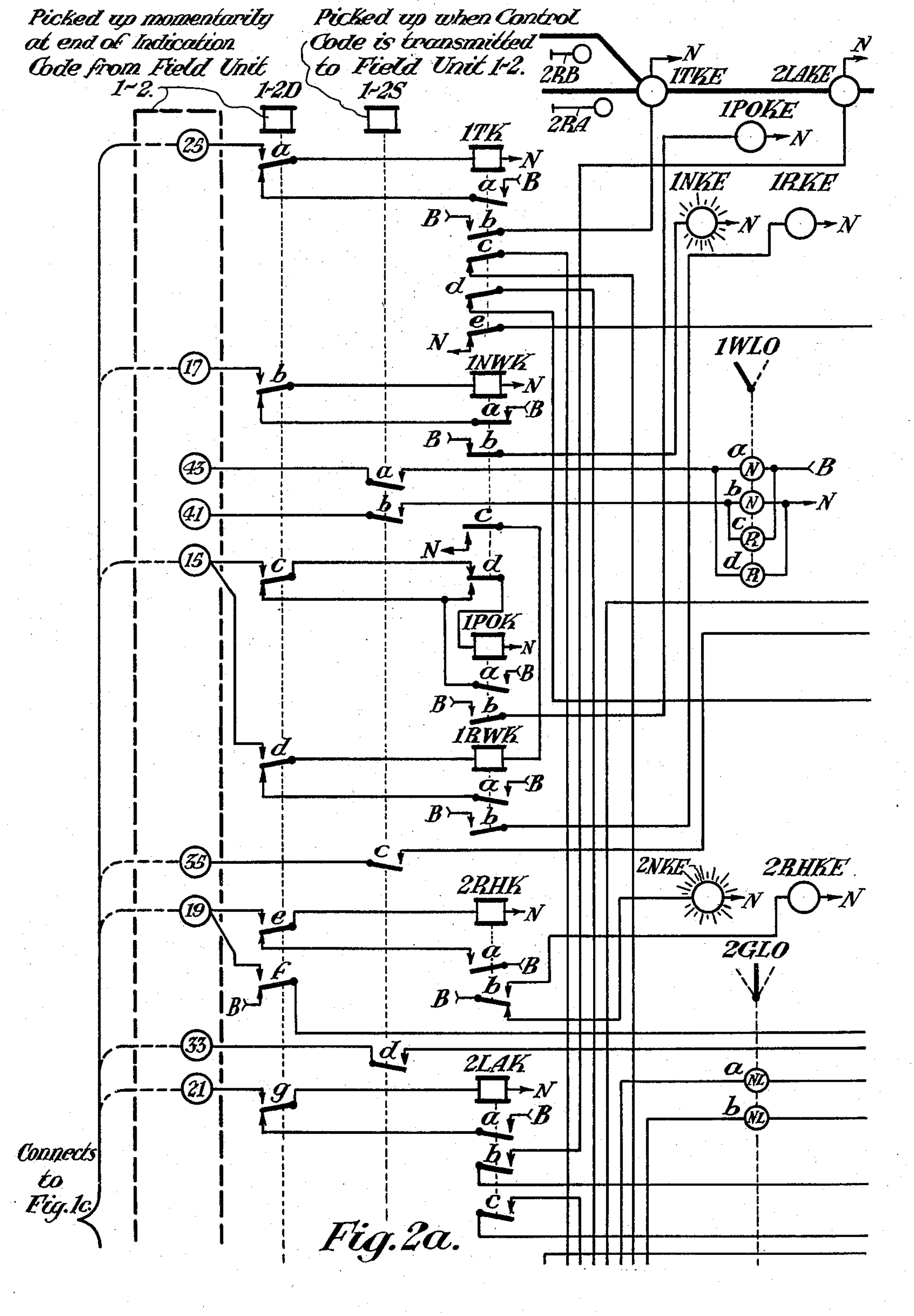
Figure 2B:
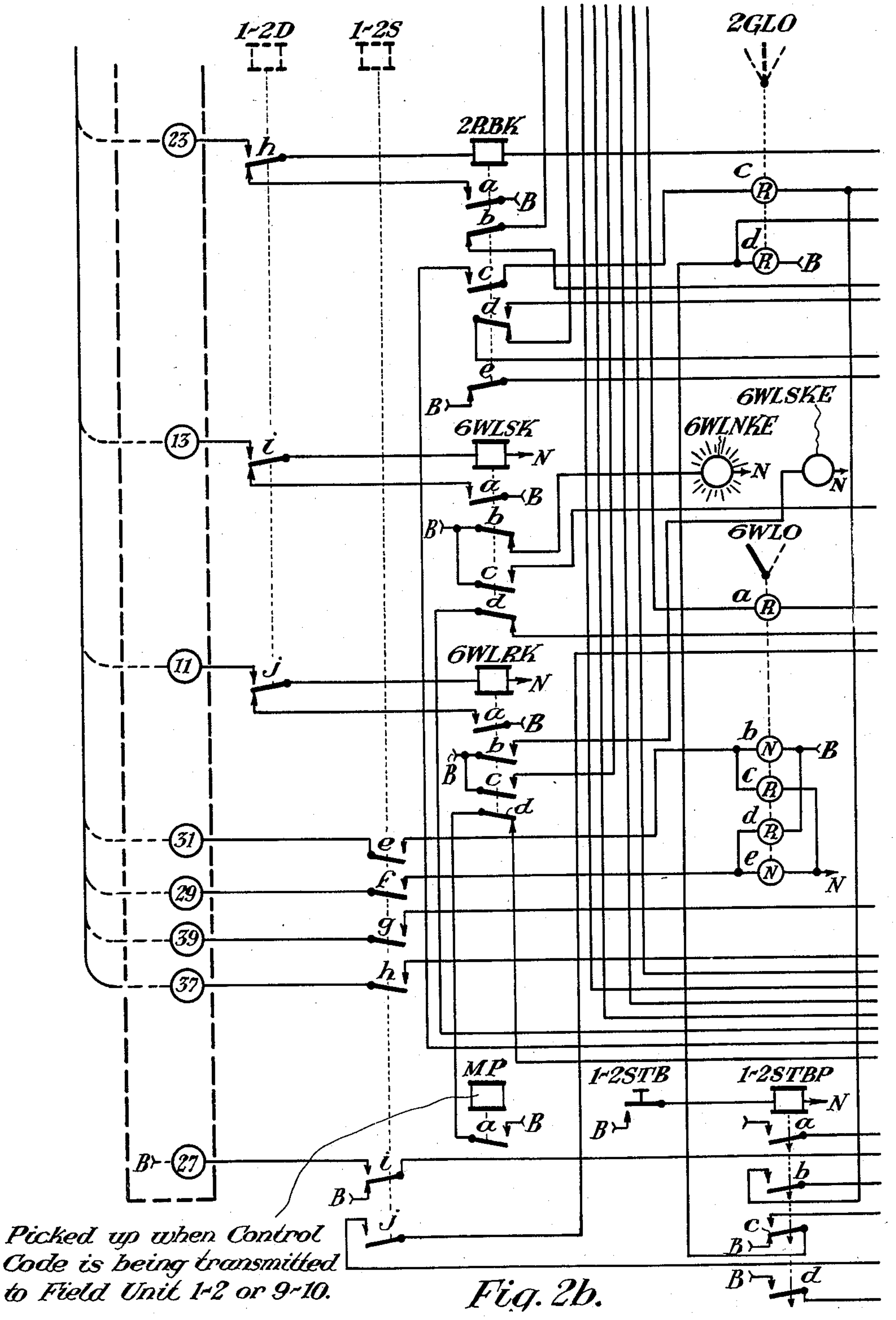
Figure 2C:
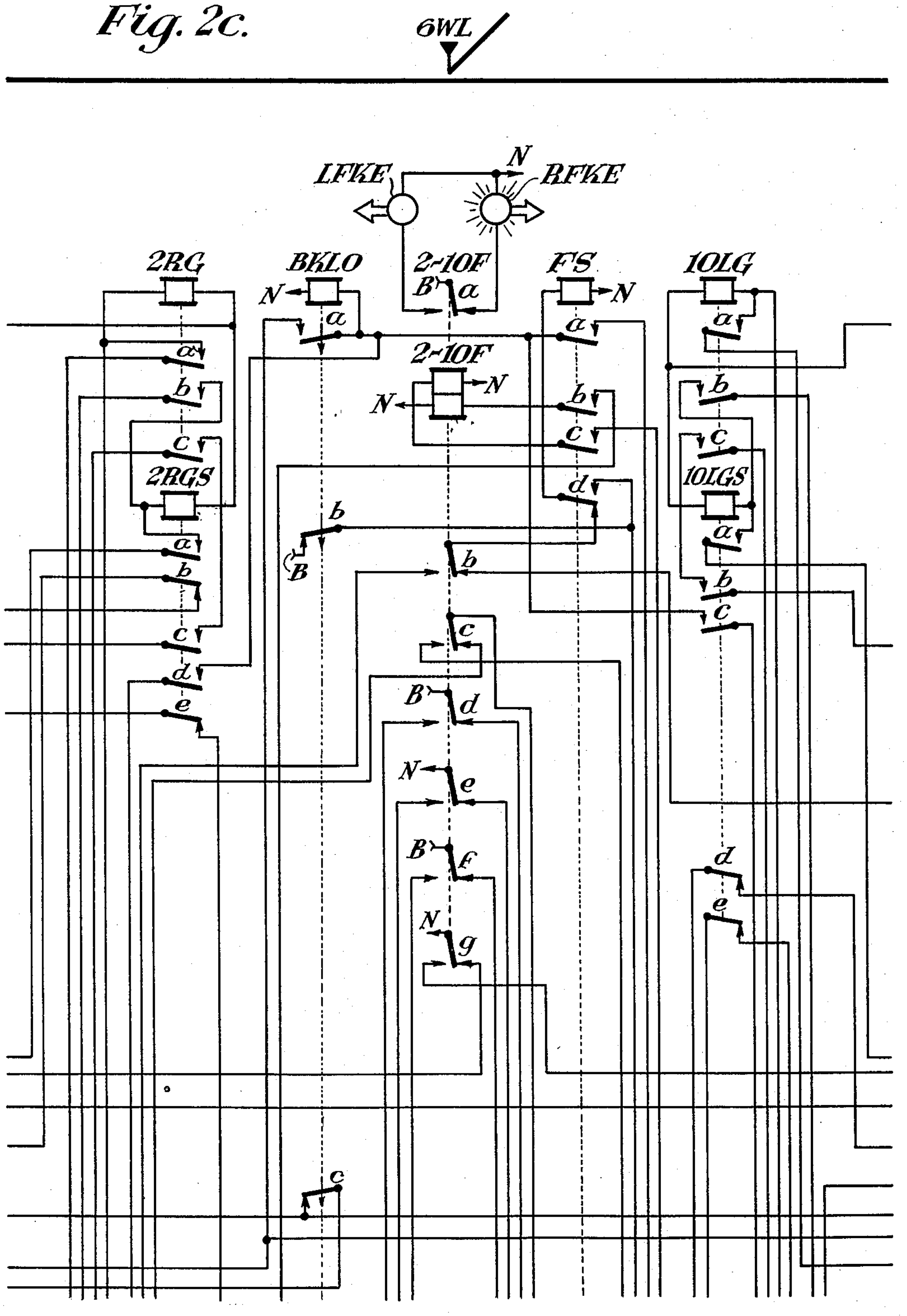
Figure 2D:
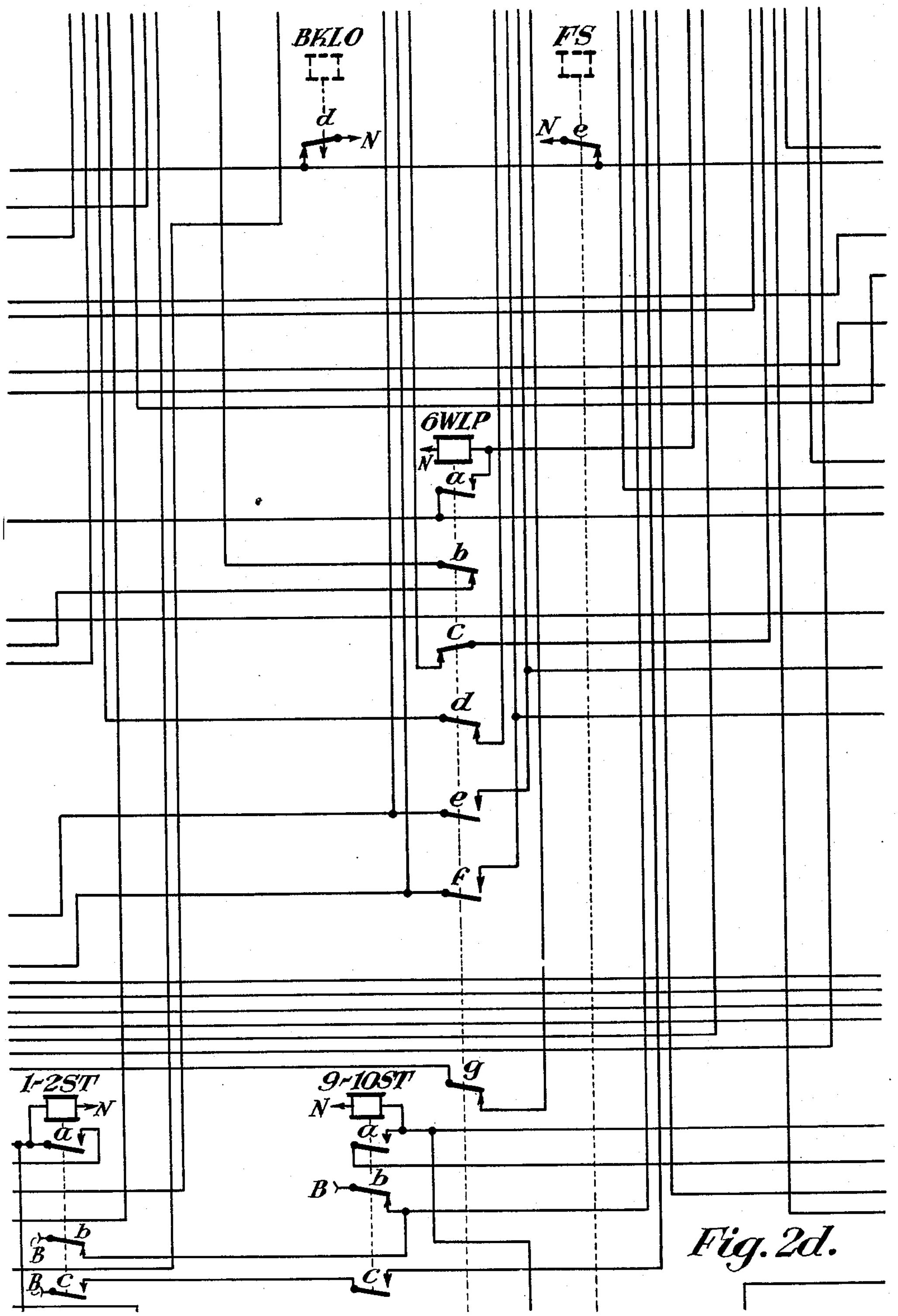
Figure 2E:
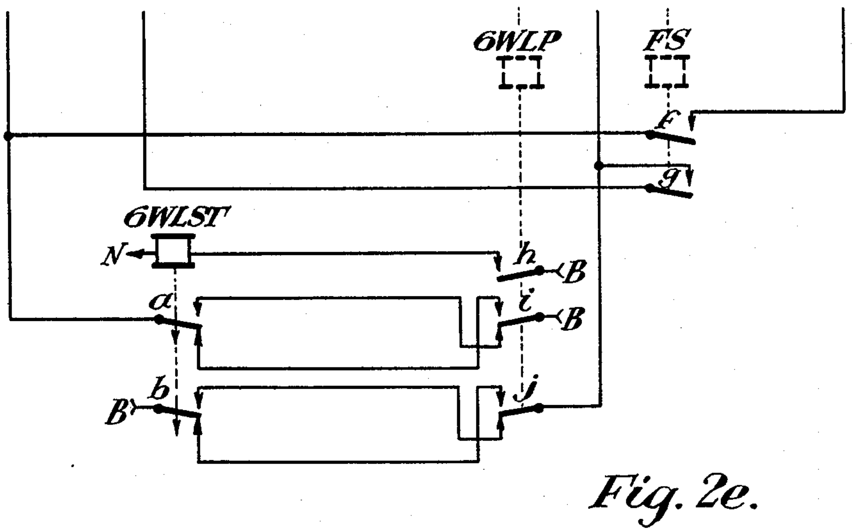

In the accompanying drawings, Figs. 1*a*, 1*b*, 1*c*, 1*d*, 1*e*, 1*f*, 1*g*, 1*h*, 1*k*, 1*m*, and 1*n*, when placed together in the manner shown in the orientation diagram illustrated by Fig. 3, constitute a diagrammatic view showing one embodiment of my invention as applied to a stretch of single track railway extending between the ends of two passing sidings at each end of the stretch.

Figure 1N:
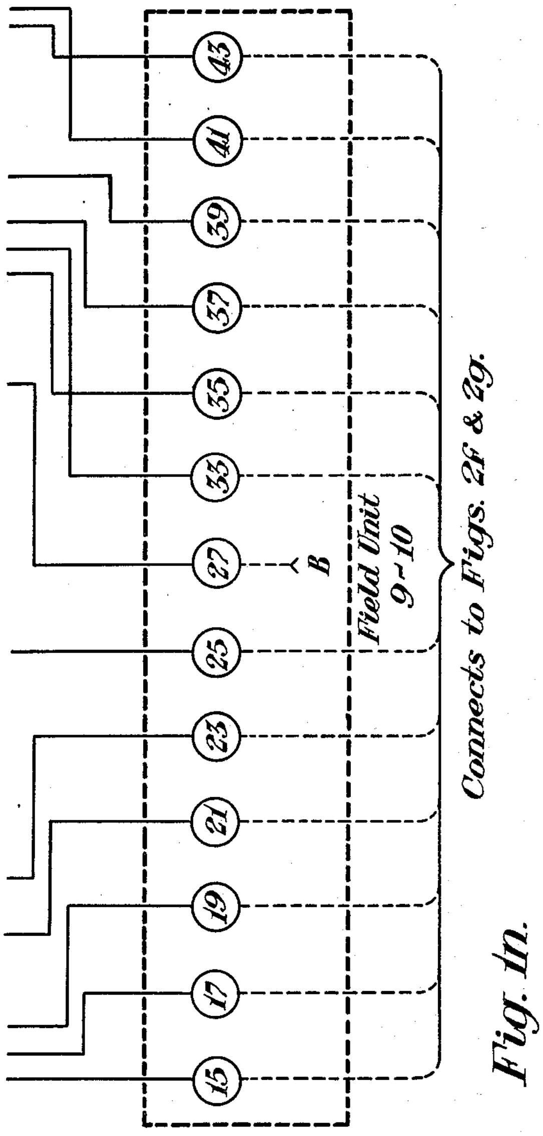
Figure 4:
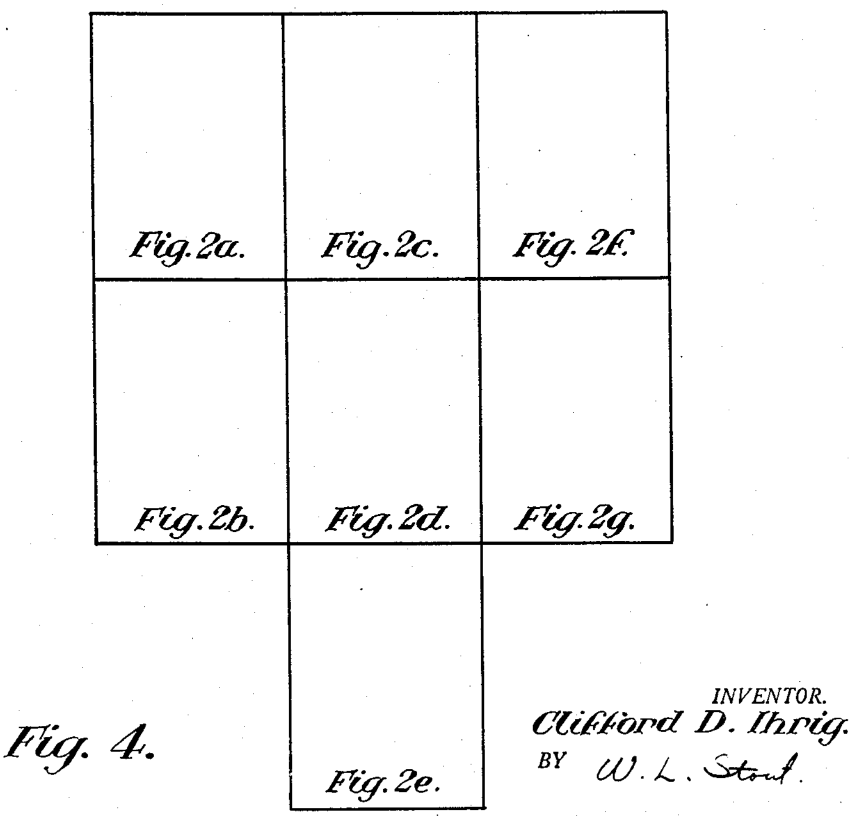
Figure 2F:
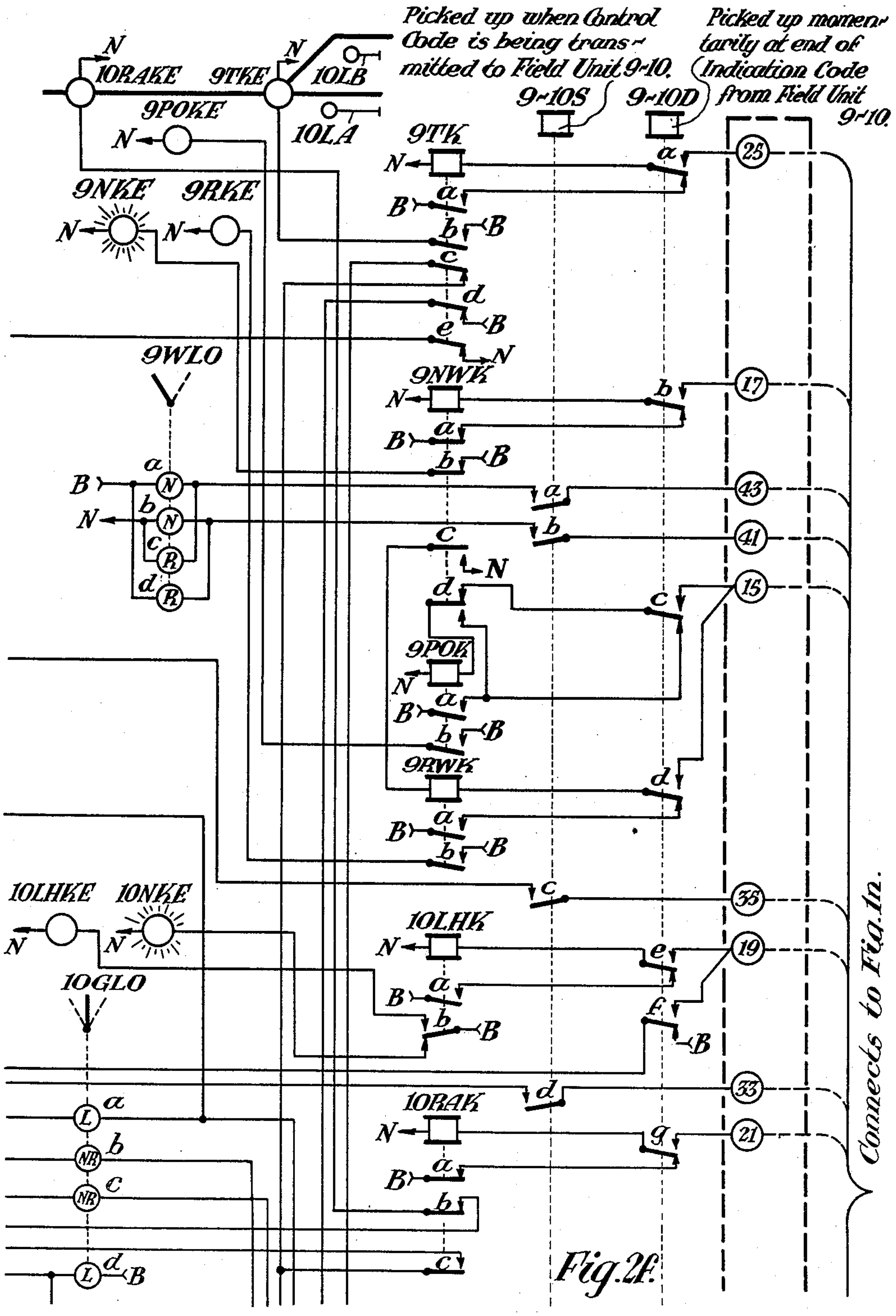
Figure 2G:
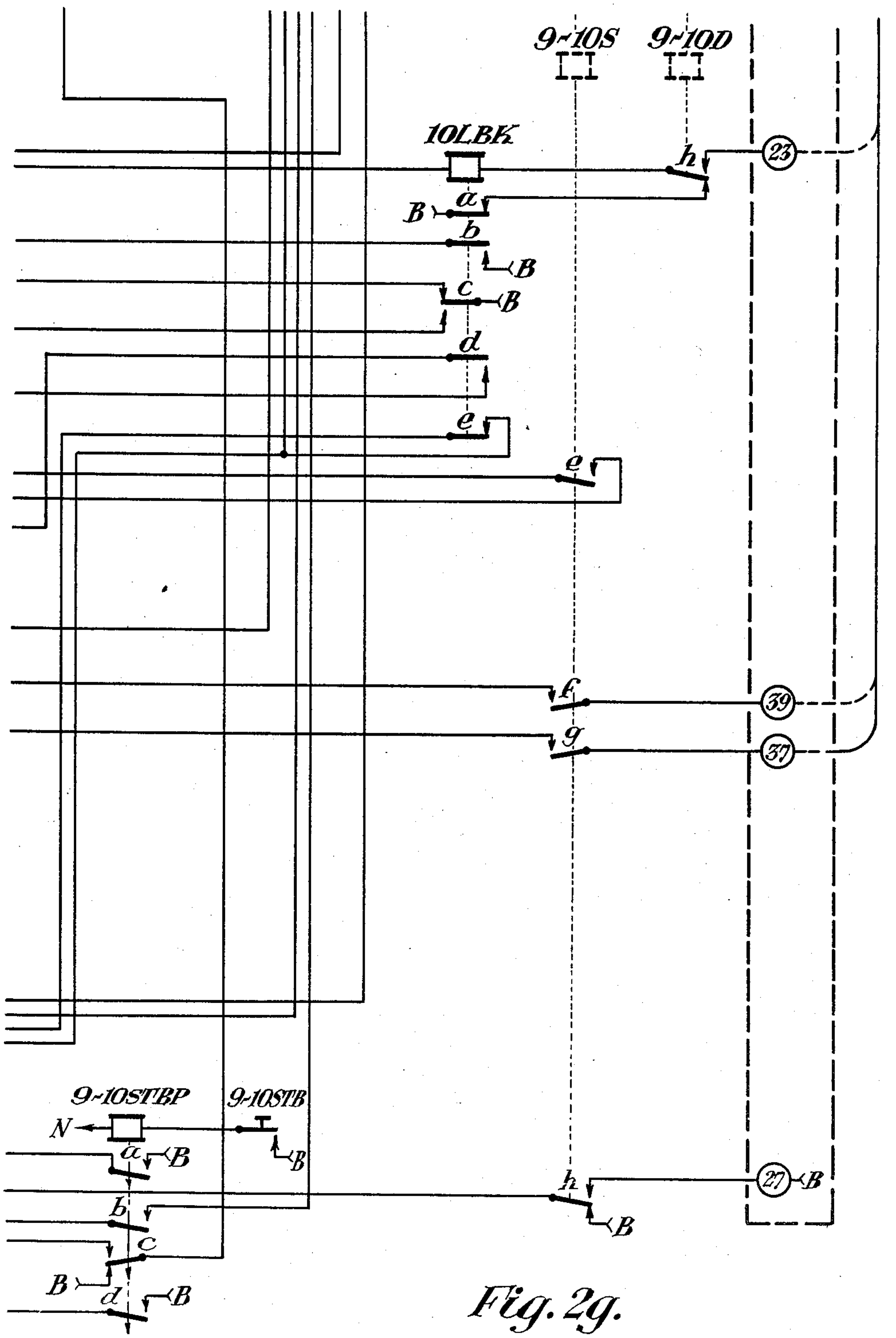

Figs. 2*a*, 2*b*, 2*c*, 2*d*, 2*e*, 2*f*, and 2*g*, when taken together in the manner shown in the orientation diagram illustrated by Fig. 4, illustrate the diagrammatic circuits for the apparatus located at the control office for the control of the wayside signaling system shown in Figs. 1*a* through 1*n*.

Similar reference characters refer to similar parts in each of the several views.

Referring first to Figs. 1*a* through 1*n*, the stretch of track between the passing sidings is divided by means of the usual insulated rail joints into a number of track circuit sections. Each of these track circuit sections is equipped with a track circuit for detecting the occupancy of the section by a train. The sections 1T and 9T at the extreme ends of the single track stretch form detector sections for providing the usual detector locking for prevention of the operation of a power operated switch located thereat when a train is occupying the section including the switch, and these track circuits are of the conventional type in which a track battery is connected across the rails at one end of the section and a track relay, such as relays 1TR and 9TR, is connected across the rails at the other end of the section. The track sections 2T, 4T, and 6T are provided with coded track circuits, as will be subsequently explained in detail. The signals which govern traffic movements through the single track stretch are the entering signals 2RA and 2RB at the left-hand or west end of the stretch, and the signals 10LA and 10LB at the right-hand or east end of the stretch, in addition to the intermediate signals 4S, 5S, 6S, and 7S. Each of these wayside signals may be of any suitable type, and are here shown as color light signals having a green lamp G, a yellow lamp Y, and a red lamp R, which when lighted indicate proceed, caution, and stop, respectively.

Each of the sections 2T, 4T, and 6T is actually provided with two track circuits, one eastbound and one westbound, each of which includes at one end a code following track relay designated by the reference character TR with a suitable prefix, and a source of track circuit energy, conveniently shown as a battery, at the other end. The track circuits could obviously be of the alternating current type, and my invention contemplates such track circuits, the direct current type being shown only for purposes of simplicity. The track circuit current is coded under the influence of traffic conditions, or as initiated by the operator at the central control office. Depending upon the direction of traffic movement, only one or the other track circuit is effective at any one time, as will be subsequently made clear. The control relays involved in an eastbound move generally include the prefix R for right-hand, and those which control westbound moves include the prefix L for left-hand, in order to make the circuits and disclosure more readily understandable.

In the interests of simplifying the disclosure, there is shown and described a system which employs but two code rates, these comprising direct current periodically interrupted at the rate of 75 times per minute to provide a caution aspect on the signals and 180 times per minute for providing a clear aspect on the signals. The coding of the energy which is supplied to the track circuits is accomplished by means of suitable code transmitters designated by the reference characters 75CT and 180CT, which may be constructed in a manner well known in the art to operate their contacts recurrently at the rates of 75 and 180 times per minute when the operating windings of the code transmitters are supplied with energy. It is to be understood that in the event cab signal apparatus on the trains moving through the stretch is to be controlled by the operation of the signaling system, alternating current energy coded over the contacts of these code transmitters may be superimposed upon the direct current track circuits, in a manner well known in the art. Following train movements may be made throughout the stretch since directional stick relays are provided at the various intermediate locations, and after having once established traffic in a given direction, no further action on the part of the control operator other than the clearing of the entrance signal to the stretch is required to permit entry of a following train.

It is to be understood that the office and field stations, one such field station being located at each end of the single track stretch, are connected over a pair of line wires, not shown, by a code communication system which may be of the type shown in Letters Patent of the United States No. 2,229,249, issued January 21, 1941, to Lloyd V. Lewis, for Remote Control Systems, or in Letters Patent of the United States No. 2,411,375, issued November 19, 1946, to Arthur P. Jackel, for Remote Control Systems, or as described in detail in Manual 506A published October 1950, by The Union Switch and Signal Company, entitled Time Code Control System.

Consideration of the detailed mode of operation of the code communication system is not needed for an understanding of this invention and it is deemed sufficient to point out that a field station is provided at each end of each track stretch to be controlled. Coding units are provided at the office and at each field station and are connected by a pair of line wires, not shown, over which control codes are at times transmitted from the office to a selected field station as a result of the operation of suitable code starting circuits in the control machine. At other times indication codes are transmitted over the same line wires from the different field stations to the office without interference.

Each code includes a distinctive code call by means of which one station only is selected to effect temporary establishment of communication channels between the office and station. Different stations have different code calls; consequently the different stations, for the different panels on the office machine, are not selected at the same time, and the same channels provide communication at different times with all of the stations.

In order to simplify the explanation of the invention, the channels are illustrated herein as separate direct wire circuits extending between the office and field stations, as designated by similarly numbered terminals on the boxes indicated by the dotted lines as comprising the office and field stations, with only those relays involved in the code system shown which are necessary for an understanding of the invention.

The office and the several wayside locations are each provided with a suitable source of direct current energy, such as a low voltage battery, the terminals of which are designated by the reference characters B and N in the drawings to indicate the positive and negative terminals, respectively, of the source.

I shall first describe the general organization of the apparatus shown on the accompanying drawings, which embodies my invention, and shall thereafter describe in detail the operation of the apparatus under various traffic conditions.

The apparatus located at the entering ends of the single track stretch, that is, the ends of the passing sidings, is generally similar in nature, and symmetrical in organization, except that the circuits for a given direction are reversed for the two ends of the single track stretch. Referring now to the apparatus located at the entrance end of the stretch at the west or left-hand end thereof, there is provided, as described hereinbefore, a detector track section 1T, which includes the track switch 1W. The track switch 1W is operated by a suitable power switch movement, the details of which are not shown, since it may be any on of a number of well-known forms. Operation of the power switch is governed by a switch stick relay such as the relay 1WSR, which governs the supply of energy to the switch movement to operate the switch to its normal or reverse position, in accordance with the manner in which traffic is to move over the switch. A switch locking relay, such as relay 1LR, is provided to insure that the switch cannot be operated at times when traffic conditions are such that its operation would be hazardous to train movements. Switch correspondence relays, such as the relays 1NWCR and 1RWCR, which check the correspondence between the position of the track switch and the control relay, are provided to insure that the switch is properly positioned for train movements thereover.

The wayside signals are governed by suitable signal control relays, such as relays 2RAHR and 2RBHR, which govern the signals 2RA and 2RB, respectively. The control circuits for signals 2LA and 2LB, which comprise the leaving signals for the single track stretch, are not shown, since these signals may be controlled in any conventional manner, and the details of the control circuits employed therefor form no part of my invention.

The coded track circuit apparatus at the left-hand end of the stretch includes a code transmitting relay 2RCR, and a code following track relay 2RTR, a front contact repeater relay 2RTFPR, and a back contact repeater relay 2RTBPR, a signal control relay 2RHR, and a clear control relay 2RDR. The latter two relays are governed by decoding apparatus of a conventional type including a decoding transformer 2RDT and a 180DU decoding unit, as will be subsequently explained. A supply of coded energy for the operation of code transmitting relay 2RCR is obtained over contacts of the 180CT and 75CT code transmitters, and selected by a contact of a signal control relay 2LAHR which is energized when signal 2LA displays other than a stop aspect. A signal locking relay 2RASR and an associated time element relay 2TER are provided for checking that the signals 2RA and 2RB are at stop, or having once been cleared, that a train either accepts the signals and moves into section 1T or that a suitable time interval as determined by operation of relay 2TER elapses before the signal locking relay can be reenergized. For controlling the direction of traffic movements through the single track stretch, a traffic relay such as relay 2RFSR is provided which is governed from the control office by suitable circuits to be subsequently explained in detail. Additionally, a signal control stick relay such as relay 2RHSR which is also governed by the control machine is provided to govern the clearing of the entering signals 2RA and 2RB.

The apparatus further includes a traffic stick repeater relay 2RFSPR with an associated time element relay 2RFSTE, a track indication stick relay 1TKSR, a track indication stick repeater relay 1TKSPR, a block indication relay 2RBKR, an approach indication relay 2LAKR, a switch lock stick relay 6WLSR, a switch lock indication relay 6WLKR, and an indication code starting relay 1ST which is associated with the field unit 1–2, and forms a portion of the code system. The detailed circuits for the control of the indication code starting relay 1ST are not shown, but this relay is controlled in such manner that its contacts are operated when an indication code is to be sent into the office, and is not restored until the code transmission has been started.

At each of the head block locations, there is provided a source of alternating current energy, not shown, whose terminals are designated by the reference characters BX and NX, such source supplying the primary winding of a power transformer PT, the secondary of which is connected through a rectifier RX to the battery LB, to provide charging energy for the battery, and additionally for energizing a power-off relay such as relay 1POR, the front contacts of which connect the winding of the transformer to terminals for supplying energy for normally lighting the signal lamps from alternating current energy, these terminals being designated by the reference characters EB and EN. The power-off relay is arranged so that, when the supply of alternating current energy fails or falls below a predetermined value, the contacts of the relay will release, to thereby connect the terminals EB and EN to the battery terminals B and N, so that under this condition the signals are lighted from the direct current battery. The power-off relay 1POR also enters into the control of indication circuits for furnishing an indication to the control operator that the supply of alternating current energy at a particular location has failed.

As previously stated, the apparatus at the opposite or right-hand end of the stretch is similar to that described above for the left-hand end of the stretch, with the exception that it is not necessary to provide, at the opposite end of the stretch, relays for controlling or indicating the operation of the switch lock, and, accordingly, there is no counterpart at the east end of the stretch of the relays 6WLSR and 6WLKR, together with their associated circuits.

The apparatus at a typical intermediate location, such as that represented by signals 6S and 7S, includes a code transmitting relay such as the relays 4LCR and 6RCR, code following track relays 4LTR and 6RTR, front and back contact slow release repeater relays such as 4LTFPR, 4LTBPR, 6RTFPR, and 6RTBPR, directional stick relays such as relays 4LSR and 6RSR, and decoding relays for signal control such as relays 6–7HR and 6–7DR, together with the associated decoding transformer DT and the 180 decoding unit 180DU. The transmission of the trackway code is governed by the code transmitters 75CT and 180CT of the type furnished at other locations, and the energy for the operation of the circuits other than the track circuits is furnished by the usual source of low voltage energy having terminals designated by the reference characters B and N. The relay 4LTPR at signal location 6S–7S is employed in connection with approach indication circuits as will be subsequently described.

At the switch lock location, there is shown a track switch which has connected thereto an electric switch lock 6WL which may be any one of the conventional forms well known in the railway signaling art, which include an electromagnetic locking device which prevents the switch from being operated unless the magnet has been energized to release the mechanical locking. As here shown, the switch lock magnet 6WLM controls an armature which when picked up removes a locking dog from a suitable quadrant, which quadrant, when reversed, allows the hand-throw switch to be operated. A contact operated by the switch lock armature is provided in the switch lock indication circuit, as well as the contacts operated directly by the switch. A switch for operation by the trainman to indicate to the dispatcher that an unlock is desired is provided in the form of a double contact switch designated by the reference character 6WLSW, but it will be understood that any type of suitably operated contacts may be employed, such, for example, as contacts actuated by the removal of a padlock from the electric switch lock. A transfer relay 6WLPBR is provided at the switch lock location for interchanging the connections between the switch lock magnet 6WLM and the switch indication and switch lock indication contacts. At the switch lock location there is provided a low voltage battery LB for the energization of the circuits at that point.

The major portion of the apparatus involved in the control of the electric switch lock 6WL is located at the intermediate signal location 4S–5S, where the circuits involved for the control of the coded track circuits and the control of the signals are substantially similar to those described for the intermediate signal location 6S–7S, and which need not be described in detail.

The relays involved in the control of the switch lock include a switch lock stick repeater relay 6WLSPR, a switch lock time element relay 6WLTER, a normal switch repeater stick relay 6NWPSR, a steady energy repeater relay 6SEPR, a steady energy time element relay SETER, a switch lock stick control relay 6WLSCR, a switch lock repeater relay 6WLPR, a switch lock repeater auxiliary relay 6WLPAR, a normal switch repeater relay 6NWPR, and a switch lock track repeater relay 6WLTPR. The detailed operation of the relays and circuits governed thereby which enter into the control of the switch lock 6WL will be made clear as the description progresses.

Considering now the apparatus provided at the control point, as shown in Figs. 2*a* through 2*g*, there is provided on the control machine a miniature diagram of the stretch of railway track involved, with suitable indication lamps located on or near the diagram to provide indications to the operator of the conditions in the field. As shown, the lamps associated with the track model include track indication lamps such as the lamps 1TKE and 9TKE which when lighted indicate the occupancy of the detector sections at the west and east ends of the stretch, respectively, the approach indication lamps 2LAKE and 10RAKE which indicate the presence of a train in the single track stretch, the power-off indication lamps 1POKE and 9POKE which indicate a power failure at the field locations, and the traffic direction lamps LFKE and RFKE which, by means of suitable arrows or other designation, indicate, when lighted, the direction in which traffic is set up for train movements through the single track stretch.

Also provided on the control machine are a plurality of levers and push buttons for governing the various functions in the field, such as the switch levers 1WLO and 9WLO, the signal levers 2GLO and 10GLO, the switch lock control lever 6WLO, and the code starting buttons 1–2STB and 9–10STB.

Associated with the switch control levers are indication lights such as 1NKE, 1RKE, 9NKE, and 9RKE, which when lighted indicate the normal or reverse position of the associated track switch. Indication lamps are also provided for each of the signal levers, such as the lamps 2NKE and 2RHKE associated with lever 2GLO, and lamps 10NKE and 10LHKE associated with lever 10GLO. These lamps when lighted indicate that the associated wayside signal is at stop or has been cleared for a train movement. Two further indication lamps are provided for the switch lock control lever, the lamps being designated as 6WLNKE and 6WLSKE to provide indications to the operator of the conditions of the electric switch lock 6WL in the field location.

Associated with each of the office coding units are a plurality of indication relays, such as relays 1TK, 1NWK, 1POK, 1RWK, 2RHK, 2LAK, 2RBK, 6WLSK, and 6WLRK. These relays are energized by the operation of the code communication system with the delivery relay, such as relay 1–2D, which picks up momentarily at the end of an indication code from field unit 1–2, connecting the windings of the indication relays to the coding unit so that appropriate relays are picked up or released in accordance with the indications which they represent at the field. Station selection relays, such as relay 1–2S which is picked up when a control code is transmitted to the field unit 1–2, serve to connect the office coding units to the contacts of suitable relays and control levers in order to establish a communication channel to the field which will cause the operation of the desired control function.

The indication relays and the connections thereof to the office coding unit for the apparatus at the east end of the stretch are similar to that described for the panel 1–2 at the west end of the stretch, with the exception that the switch lock control and indication circuits are not provided at this point since this control is established through the field station 1–2 alone. The apparatus in the control machine also includes a polar traffic relay 2–10F, a block indication lockout relay BKLO, a traffic stick relay FS, a switch lock repeater relay 6WLP, a switch lock starting relay 6WLST, signal control relays such as relays 2RG and 10LG, signal control stick relays such as relays 2RGS and 10LGS, starting push button repeater relays 1–2STBP and 9–10STBP, and starting relays 1–2ST and 9–10ST. A relay MP is also provided in the code communication system which is picked up when a control code is being transmitted to either of the field units 1–2 or 9–10. The control circuits for relay MP are not shown since they form a part of the conventional code communication system.

Having thus described the various components of the signaling system, I shall now describe the apparatus in the condition in which it is shown in the drawings, namely, with the entering signals at each end of the single track stretch at stop, with the section unoccupied, and with the traffic direction in the stretch set up from west to east.

Considering first the condition of the equipment at the control office, the switch levers 1WLO and 9WLO are assumed to be in their normal position, and the switch indication relays 1NWK and 9NWK to be picked up, so that circuits are established over the front contacts *b* of these relays to supply energy to the normal switch indication lamps. The signal levers 2GLO and 10GLO are considered to be in their center or normal position, and the signal indication relays 2RHK and 10LHK are released at this time, so that circuits are established over the back contacts *b* of these relays to supply energy to the normal signal indication lamps 2NKE and 10NKE. With the switch lock 6WL in its normal condition in the field, and the control lever 6WLO in its normal position at the office, the indication relays 6WLSK and 6WLRK are both deenergized, and a circuit is established over back contact *b* of relay 6WLSK for supplying energy to the normal switch lock indication lamp 6WLNKE. The traffic relay 2–10F has its contacts positioned to their right-hand or reverse position, and in this position, reverse contact *a* of relay 2–10F establishes an obvious circuit for supplying energy to the traffic indication lamp RFKE, which indicates that traffic is set up in the stretch to move from west to east. The various track and approach indication lamps as well as the power-off indication lamps are all dark at this time.

Referring now to the single track stretch at the left-hand end thereof, the signal control relays 2RAHR and 2RBHR are both released, with back contact *a* of relay 2RAHR establishing a circuit for supplying energy to the red lamp R of signal 2RA, and back contact *b* of relay 2RBHR establishing a circuit for supplying energy to the red lamp R of signal 2RB. Since switch 1W is in its normal position, a circuit is established for supplying energy to the switch correspondence relay 1NWCR, this circuit including a normal contact *n* governed by the switch movement and a normal contact *b* of the switch control relay 1WSR, so that relay 1NWCR is energized and its contacts are picked up while relay 1RWCR has its contacts released at this time.

Signal locking relay 2RASR is picked up at this time by energy supplied over a circuit which includes the back contact *a* of relay 2RBHR, back contact *b* of relay 2RAHR, back contact *b* of relay 2RHSPR, and front contact *a* of relay 2RASR. Relay 1TKSR is picked up at this time by a circuit which includes contacts of relays in the field code unit 1–2, not shown, terminal 27, normal contact *a* of the indication code starting relay 1ST, front contact *c* of relay 1TR, and the winding of relay 1TKSR. Relay TKSR is also energized by its stick circuit which includes its own front contact *a* and front contact *c* of relay 1TR. With relay 1TKSR picked up, its front contact *c* establishes an obvious circuit for energizing relay 1TKSPR. Relay 2RBKR is released and relay 2LAKR is picked up at this time, as will be explained later. With alternating current energy being supplied to the primary winding of transformer PT, relay 1POR will have its contacts picked up.

The contacts of relays 2RHSR and 2RFSR occupy their normal and reverse positions, respectively, at this time, and a circuit is established over contacts of these relays for energizing the code transmitting relay 2RCR with steady energy, which circuit includes normal contact *a* of relay 2RHSR, reverse contact *b* of relay 2RFSR, front contact *b* of relay 2RASR, front contact *a* of relay 1TR, back contact *a* of relay 2RTR, and the winding of relay 2RCR. With energy steadily supplied to the winding of relay 2RCR, front contact *a* of this relay connects battery 2RTB across the rails of section 2T at the west end thereof. Since relay 2RTR is disconnected from the rails of section 2T at this time by back contact *a* of relay 2RCR, the contacts of relay 2RTR will remain in their deenergized position, with the result that relays 2RTFPR, 2RTBPR, 2RHR, and 2RDR will all be released. It will therefore be seen that the track section 2T is supplied with steady energy at this time at the west or left-hand end of the section.

At the right-hand end of section 2T, that is, at signal location 4S–5S, contact *a* of relay 2LCR is released at this time so that its back contact *a* connects the winding of track relay 2LTR across the rails of section 2T, with the result that the contacts of relay 2LTR are continuously picked up. With contact *a* of relay 2LTR picked up, an obvious circuit is established for energizing relay 2LTFPR. However, relay 2LTBPR will not be picked up at this time, since the circuit for energizing this relay is open at back contact *a* of relay 2LTR, even though front contact *a* of relay 2LTFPR is closed. Relays 2LSR, 4RTR, 4RTFPR, 4RTBPR, 4RSR, 4–5HR, and 4–5DR are released at this time. The relays associated with the control of the switch lock are deenergized at this time with the exception of relays 6NWPSR, 6WLPR, and 6NWPR. Relay 4RTPR, which is involved in the control of the block indication circuits, is picked up at this time, as will be fully discussed shortly.

With relay 2LTFPR picked up and relay 2LSR released, a circuit is established for supplying steady energy to the winding of the code transmitting relay 4RCR, which circuit may be traced from terminal B at front contact *c* of relay 2LTFPR, over back contact *c* of relay 2LSR, back contact *c* of relay 4–5HR, back contact *d* of relay 4RTR, back contact *c* of relay 4RSR, front contact *h* of relay 6NWPSR, front contact *c* of relay 6NWPR, and through the winding of relay 4RCR to terminal N. With contact *a* of relay 4RCR picked up, the battery 4RTB is connected across the rails of section 4T at the left-hand end thereof, and relay 4RTR is steadily deenergized. Thus the steady energy present in section 2T at this time feeding from the left-hand or west end of the section causes this steady energy to be retransmitted into the track rails of section 4T at the left-hand end thereof.

At signal location 4S–5S, the red lamp R of signal 4S is supplied with energy at this time by a circuit including back contact *e* of relay 4RTFPR, so that this signal displays a red or stop aspect. Similarly, the red lamp R of signal 5S is supplied with energy at this time by a circuit including front contact *d* of relay 2LTFPR and back contact *d* of relay 4–5HR, so that signal 5S also displays a red or stop aspect.

At signal location 6S–7S, the steady energy supplied over the rails of section 4T from the left-hand end thereof is supplied to the winding of relay 4LTR over back contact *a* of relay 4LCR which is released at this time, so that the contacts of relay 4LTR are picked up. With contact *a* of relay 4LTR picked up, relay 4LTFPR is energized, but relay 4LTBPR remains deenergized at this time since back contact *a* of relay 4LTR interrupts its energizing circuit. Relays 4LSR, 6RTR, 6RTFPR, 6RTBPR, 6RSR, 6–7HR, and 6–7 DR are all released at this time. Relay 4LTPR which is involved in the block indication circuit is picked up as will be explained subsequently. Relay 6RCR is steadily energized at this time by its circuit which may be traced from terminal B at front contact *c* of relay 4LTFPR, over back contact *c* of relay 4LSR, back contact *c* of relay 6–7HR, back contact *d* of relay 6RTR, and back contact *c* of relay 6RSR, through the winding of relay 6RCR to terminal N. With contact *a* of relay 6RCR continuously picked up, relay 6RTR is deenergized and battery 6RTB is continuously connected across the rails of section 6T to supply steady energy which feeds over the rails to the east end of the section. The red lamps of signals 6S and 7S are supplied with energy over obvious circuits similar to those traced for the red lamps of signals 4S and 5S. Thus signals 6S and 7S display red or stop aspects at this time.

At the right-hand or east end of the stretch, the steady energy supplied over the rails of section 6T flows through the winding of relay 6LTR, since contact *a* of relay 6LCR is released at this time. Accordingly, the contacts of relay 6LTR will be picked up, back contact *a* of this relay maintaining relay 6LCR deenergized. Relay 6LTFPR is energized over front contact *b* of relay 6LTR, while back contact *b* of this latter relay interrupts the control circuit for relay 6LTBPR so that relay 6LTBPR is released at this time. Relay 10LHR and relay 10LDR will be released, since the contacts *c* and *d* of relay 6LTR are continuously picked up. With the track switch 9W in its normal position, the normal contact *n* operated by the switch movement 9WM will be closed and the reverse contact *r* opened, so that the circuit for energizing relay 9NWCR is completed over contact *b* of relay 9WSR which is in its normal position at this time, with the result that relay 9NWCR is picked up while relay 9RWCR is released. Relays 10LAHR and 10LBHR are both released to establish obvious circuits for supplying energy to the red lamps R of signals 10LA and 10LB respectively. Relay 10LASR is picked up at this time by the circuit including back contact *a* of relay 10LBHR, back contact *b* of relay 10LAHR, back contact *b* of relay 10LHSPR, and front contact *a* of relay 10LASR. At this time, relay 10LFSR has its contacts operated to their right-hand or reverse position, relay 10LHSR has its contacts in their left-hand or normal position, relay 10LFSPR is picked up, relays 9TKSR and 9TKSPR are picked up, relay 10LBKR is picked up, and relay 10RAKR has its contacts released. Since it will be assumed that alternating current energy is supplied at the field location at the east end of the single track stretch, the contacts of relay 9POR will be picked up at this time.

At signal location 6S–7S, relay 4LTPR is picked up by energy supplied over a circuit which may be traced from terminal B at front contact *f* of relay 4LTFPR, and through the winding of relay 4LTPR to terminal N. Energy is also supplied from terminal B of the battery at location 6S–7S over front contact *f* of relay 4LTFPR and line wire 79 to signal location 4S–5S, and through the winding of relay 4RTPR at this location to terminal N. The negative sides of the batteries at the various locations are connected through a common wire designated by the reference character 77, which connects the terminals N at location 4S–5S, at the switch lock location, at signal location 6S–7S, and, by wire 93, at the east end of the stretch. At signal location 4S–5S, with contact *a* of relay 4RTPR picked up and front contact *f* of relay 2LTFPR closed, energy from terminal B is supplied over the line wire 61 to the location at the west end of the stretch to thereby energize relay 2LAKR, over the circuit including back contact *d* of relay 2RTFPR, front contact *b* of relay 1TKSR, and the winding of relay 2LAKR to terminal N. The negative terminal of the battery at this location is connected to the negative terminals of the other batteries throughout the stretch over the line wire 67.

Having thus described the condition of the apparatus as shown on the drawings, with the stretch unoccupied and the direction of traffic such as to permit eastbound train movements, it will now be assumed that the operator at the control office desires to clear the signals for an eastbound train to enter the stretch. Accordingly, such operation will now be described together with the operation of the apparatus as the eastbound train enters, moves through, and leaves the single track stretch. The operator at the control point will accordingly operate the signal lever 2GLO to its right-hand position, and depress the starting button 1–2STB to send a control code to the field station 1–2 to clear the entering signal for the eastbound train. It will be assumed that in this case the train is approaching on the main track so that switch 1W is to remain in its normal position and signal 2RA is to be cleared. When push button 1–2STB is depressed, the repeater relay 1–2STBP picks up momentarily, to thereby establish a circuit for picking up the signal control relay 2RG. This circuit may be traced from terminal B at contact *d* of lever 2GLO closed in the right-hand position, over front contact *c* of relay 1–2STBP, through the winding of relay 2RG, and over back contact *e* of the track indication relay 1TK to terminal N. When relay 2RG picks up, and the push button relay 1–2STBP releases, a stick circuit including back contact *c* of relay 1–2STBP and front contact *a* of relay 2RG is established for relay 2RG, so that this relay remains picked up even though the lever 6R 2GLO may thereafter be inadvertently returned to its normal position. This is to insure that the signal cannot be placed at stop except by deliberate manipulation of the signal lever 2GLO to its normal position followed by another operation of the push button 1–2STB to transmit a control code to restore the signal to stop. It is now assumed that the operation of the starting relay 1–2ST which is governed by front contact *a* of relay 1–2STBP has taken place, with the result that relay 1–2ST has picked up its contacts. Front contact *a* completes a stick circuit including a back contact *i* of the station selection relay 1–2S, so that relay 1–2ST will remain picked up until the code transmission has reached that portion in which the appropriate field station is selected. With the code transmission being in effect, relay MP will also be picked up, so that with relay 2RG picked up, a circuit is established for relay 2RGS which may be traced from terminal B at front contact *a* of relay MP, over back contact *d* of relay 6WLRK, back contact *g* of relay 6WLP, reverse contact *c* of relay 2–10F, front contact *j* of relay 1–2S, (closed after station selection), front contact *b* of relay 2RG, through the winding of relay 2RGS, and over back contact *e* of relay 1TK to terminal N. When relay 2RGS picks up, it establishes a stick circuit which may be traced from terminal B at back contact *f* of relay 1–2D, over front contact *a* of relay 2RGS, through the winding of relay 2RGS, and over back contact *e* of relay 1TK to terminal N. Accordingly, relay 2RGS will be maintained energized after the completion of the code.

When relay 1–2S picks up, at the completion of the code selection for field station 1–2, a circuit is established for reversing the contacts of relay 2RHSR at the field location at the west end of the stretch, which circuit may be traced from terminal B at reverse contact *f* of relay 2–10F, over back contact *d* of relay 6WLP, front contact *c* of relay 2RG, front contact *c* of relay 2RGS, front contact *c* of relay 1–2S, through the code communication equipment by way of terminal 35 at the office location, through terminal 35 of the field unit 1–2, through the winding of relay 2RHSR from right to left, through terminal 33 of the field unit and terminal 33 of the office unit 1–2, over front contact *d* of relay 1–2S, and reverse contact *g* of relay 2–10F to terminal N. With energy supplied to the upper winding of relay 2RHSR with the current flowing through the winding from right to left, the contacts of relay 2RHSR will be operated from their normal to their reverse position.

When contact *a* of relay 2RHSR operates to its reverse position, it interrupts the supply of energy to the winding of relay 2RCR, so that contact *a* of this relay releases to thereby interrupt the supply of energy from track battery 2RTB to the rails of section 2T, and to connect the winding of the code following track relay 2RTR across the section rails at the left-hand end thereof.

At the right-hand end of section 2T, the supply of steady energy to the winding of track relay 2LTR is interrupted and this relay releases its contacts. After a short time interval the contacts of relay 2LTFPR will release and front contact *c* of this relay interrupts the supply of energy to the winding of relay 4RCR, so that contact *a* of relay 4RCR disconnects the track battery 4RTB from the section rails at the left-hand end of section 4T and connects the winding of the code following track relay 4RTR across the rails at this point.

In a similar manner, the interruption of the supply of steady energy to the winding of relay 4LTR at the right-hand end of section 4T results in the release of the contacts of this relay followed by the subsequent release of the contacts of relay 4LTFPR. Front contact *c* of this latter relay interrupts the supply of energy to the winding of relay 6RCR, which in turn disconnects the track battery 6RTB from the section rails and connects the winding of code following track relay 6RTR across the rails. At the right-hand end of section 6T, the interruption of the supply of energy to the winding of relay 6LTR results in the release of the contacts of this relay followed by the subsequent release of the contacts of relay 6LTFPR.

A circuit is now established for supplying coded energy to the winding of relay 6LCR, the code rate of this energy being dependent upon whether or not signal 10RA is at stop or has been cleared for a train to move out of the single track stretch. Assuming that the signal 10RA is cleared, the contact *a* of relay 10RAHR will be picked up at this time, and a circuit is established for energizing the winding of relay 6LCR at the code rate of 180 times per minute. This circuit is traced from terminal B at front contact *a* of the code transmitter 180CT, over front contact *a* of relay 10RAHR, back contact *c* of relay 6LTFPR, front contact *a* of relay 10LFSPR, reverse contact *b* of relay 10LFSR, front contact *b* of relay 10LASR, front contact *a* of relay 9TR, back contact *a* of relay 6LTR, and through the winding of relay 6LCR to terminal N. Accordingly, the contacts of relay 6LCR will be recurrently picked up and released to connect the battery 6LTB at the 180 code rate across the rails of section 6T at the right-hand end thereof. This coded energy flows westward over the rails of section 6T to the left-hand end thereof, and with contact *a* of relay 6RCR released, the energy is supplied to the winding of relay 6RTR, so that this relay operates its contacts recurrently at the 180 code rate. With contact *a* of relay 6RTR recurrently operating, energy is supplied to the windings of relays 6RTFPR and 6RTBPR, so that both of these relays become picked up.

With contact *a* of relay 4LTBPR released and contact *a* of relay 6RTBPR picked up, a circuit is established for supplying energy to the primary winding of the decoding transformer DT, which circuit includes back contact *a* of relay 4LTBPR, front contact *a* of relay 6RTBPR, and either back contact *b* of relay 6RTR, back contact *b* of relay 4LTR, and the lower portion of the primary winding of transformer DT, or front contact *b* of relay 6RTR, when this relay is picked up, and the middle portion of the primary winding of transformer DT. The energy induced in the secondary winding of transformer DT is rectified mechanically by the operation of contact *c* of relay 6RTR, so that pulses of direct current energy are supplied to the winding of relay 6–7HR, and its contacts will therefore pick up. At this time, since the relay 6RTR is responding to 180 code, sufficient energy will be supplied to the winding of relay 6–7DR through the 180DU decoding unit from the full primary winding of transformer DT to pick up the relay and accordingly the contacts of relay 6–7DR will be picked up.

When contact *a* of relay 6–7HR picks up, a circuit is established for supplying energy to the winding of relay 6RSR, which circuit may be traced from terminal B at front contact *a* of relay 6–7HR, over back contact *b* of relay 4LTFPR, front contact *b* of relay 6RTFPR, and through the winding of relay 6RSR to terminal N. The picking up of relay 6RSR has no effect on the operation of the circuits at this particular time. When contact *b* of relay 6–7HR picks up, a circuit is established for supplying energy at the 180 code rate to the winding of relay 4LCR, which circuit may be traced from terminal B at back contact *c* of relay 4LTFPR, over back contact *a* of relay 4LSR, contact *a* of code transmitter 180CT, front contact *b* of relay 6–7HR, back contact *d* of relay 4LTR, back contact *b* of relay 4LSR, and through the winding of relay 4LCR to terminal N. Accordingly, contact *a* of relay 4LCR recurrently operates at 180 times per minute to connect the battery 4LTB across the rails of section 4T at the right-hand end thereof. This energy is supplied over the rails of section 4T to the west end thereof, where it energizes the winding of relay 4 RTR, to cause the contacts of this relay to operate at the 180 code rate. The code following operation of the contacts of relay 4RTR results in the closing of circuits similar to those described at signal location 6S–7S to thereby energize relays 4RTFPR, 4RTBPR, 4RSR, and 4–5HR. Additionally, since the energy supplied to the decoding transformer DT at signal location 4S–5S is at the 180 code rate, sufficient energy will be supplied through the decoding unit 180DU to cause the contacts of relay 4–5DR to become picked up.

At signal location 6S–7S, energy is supplied to the green lamp G of signal 6S at this time by a circuit which includes front contact *e* of relay 6RTFPR, front contact *e* of relay 6–7HR, and front contact *b* of relay 6–7DR. Although contact *d* of relay 6–7HR is picked up at this time, energy is still supplied to the red lamp R of signal 7S over back contact *g* of relay 4LTFPR so that signal 7S continues to display a red or stop aspect.

At this time, energy is supplied to the green lamp G of signal 4S by the circuit including front contact *e* of relay 4RTFPR, front contact *e* of relay 4–5HR, front contact *b* of relay 6NWPSR, and front contact *b* of relay 4–5DR, so that signal 4S displays a green or clear aspect. Signal 5S will continue to display a red or stop aspect, since contact *d* of relay 2LTFPR is released at this time to establish the supply of energy to the red lamp R of the signal.

The code rtansmitting relay 2LCR at signal location 4S–5S is now recurrently operated at the 180 code rate, being energized by a circuit which may be traced from terminal B at back contact *c* of relay 2LTFPR, over back contact *a* of relay 2LSR, contact *a* of code transmitter 180CT, front contact *b* of relay 4–5HR, back contact *d* of relay 2LTR, front contact *a* of relay 6NWPSR, back contact *b* of relay 2LSR, and through the winding of relay 2LCR to terminal N. As a result of the recurrent operation of contact *a* of relay 2LCR, energy coded at the 180 code rate is supplied from the track battery 2LTB to the rails of section 2T and is supplied westward over the rails of this section to energize the winding of relay 2RTR at the west end of the stretch, so that this relay operates its contacts at a corresponding rate.

The code following operation of contacts *a, b, c,* and *d* of track relay 2RTR causes the energization of relays 2RTFPR, 2RTBPR, 2RHR, and 2RDR, so that each of these relays will have its contacts picked up.

When contact *a* of relay 2RHR picks up, a circuit is established for energizing relay 2RHSPR, which circuit may be traced from terminal B at reverse contact *d* of relay 2RFSR, over reverse contact *b* of relay 2RHSR, front contact *a* of relay 2RHR, back contact *a* of relay 1RWCR, front contact *a* of relay 1NWCR, front contact *b* of relay 1TKSPR, and through the winding of relay 2RHSPR to terminal N. When contact *b* of relay 2RHSPR picks up, it interrupts the stick circuit for relay 2RASR and this relay releases. The release of contact *d* of relay 2RASR interrupts the circuit for energizing the locking relay 1LR, with the result that its contacts *b* and *c* release to open the circuit for supplying energy to the switch movement 1WM, so that the switch cannot be operated at this time. When contact *a* of relay 1LR releases, a circuit is established for energizing the signal control relay 2RAHR, which may be traced from terminal B at back contact *a* of relay 1LR, over back contact *c* of relay 2RASR, back contact *b* of relay 2TER, front contact *a* of relay 2RHSPR, front contact *c* of relay 1NWCR, and through the winding of relay 2RAHR to terminal N. When contact *a* of relay 2RAHR picks up it establishes a circuit for supplying energy to the green lamp G of signal 2RA, this circuit including front contact *b* of relay 2RDR, so that signal 2RA now displays a clear or proceed aspect. The picking up of contact *b* of relay 2RAHR further interrupts the stick circuit for relay 2RASR and the picking up of contact *c* of relay 2RAHR energizes a circuit for transmitting a clear signal indication to the control machine.

From the foregoing, it will be seen that, with the direction of traffic in the single track stretch designated from west to east, the clearing of a signal for an eastbound train movement involves the removal of steady energy supplied at the west end of the stretch, this removal causing coded energy to be supplied at the east end of the stretch and cascaded through the various track sections to clear the corresponding signals, including the entering head block signal at the west end of the stretch.

During this reversal of energization of the track circuits in the stretch, a reversal of the circuits for supplying the approach indications on the control machine will take place, and it is necessary to prevent unwanted indication on the machine of a track occupancy, due to this reversal. The manner in which the circuits operate to eliminate such a false indication will now be described.

Considering first the wayside circuits in thei rcondition as shown, the approach relay 2LAKR at the west end of the stretch is governed by the circuit which includes front contact *b* of relay 1TKSR, back contact *d* of relay 2RTFPR, line wire 61 to signal location 4S–5S, front contact *f* of relay 2LTFPR, and front contact *a* of relay 4RTPR. As a result, in the condition shown in the drawings, relay 2LAKR at the left-hand end of the stretch is energized. Relay 4RTPR at the signal location 4–5 is energized by energy supplied over wire 79 from signal location 6S–7S, where energy is supplied to the line circuit over front contact *f* of relay 4LTFPR. Relay 4LTPR at location 6S–7S is also energized over this front contact *f*. Front contact *a* of relay 4LTPR is included in a circuit for controlling relay 10RAKR, at the east end, which includes front contact *d* of relay 6RTFPR, line wire 91 to the location at the east end of the stretch, back contact *d* of relay 6LTFPR, and front contact *b* of relay 9TKSR. A second control circuit for relay 10RAKR includes front contact *a* of relay 10LDR, front contact *d* of relay 6LTFPR, and front contact *b* of relay 9TKSR. However, under the normal conditions shown, relay 6LTFPR is picked up and contact *a* of relay 10LDR is released, so that relay 10RAKR at the eastern end of the stretch is deenergized. When the supply of steady energy is cut off at the west end of the stretch, relay 2LTFPR will release and its front contact *f* will interrupt the circuit for supplying energy to the winding of relay 2LAKR, with the result that this relay releases. Closing of back contact *a* of relay 2LAKR completes a circuit to the office during a subsequent indication code, over terminals 21 and front contact *g* of delivery relay 1–2D, to energize relay 2LAK. Upon completion of the indication cycle, relay 2LAK will remain picked up over the stick circuit including its front contact *a* and back contact *g* of relay 1–2D.

Again considering the conditions in the field, front contact *f* of relay 4LTFPR releases and interrupts the supply of energy to relays 4LTPR and 4RTPR, but the release of these relays has no effect on the circuits at this time. At the east end of the stretch, the release of relay 6LTFPR connects the circuit for energizing relay 10RAKR to the line wire 91, but since relay 6RTFPR is still released at signal location 6S–7S, relay 10RAKR does not pick up at this time. However, when coded energy is supplied over the rails from the east end of the stretch, relay 6RTFPR will be picked up at signal location 6S–7S, relay 4RTFPR will be picked up at signal location 4S–5S, and relay 2RTFPR and relay 2RDR will be picked up at the west end of the stretch.

Relay 4LTPR at location 6S–7S and relay 4RTPR at location 4S–5S will now be picked up by a circuit which may be traced from terminal B over front contact *d* of relay 4RTFPR, through the winding of relay 4RTPR to terminal N, and also over line wire 79 to the winding of relay 4LTPR at signal location 6S–7S. Front contact *a* of relay 4LTPR now completes the circuit including this contact, front contact *d* of relay 6RTFPR, line wire 91, back contact *d* of relay 6LTFPR, and the front contact *b* of relay 9TKSR to energize relay 10RAKR at the east end of the stretch. When relay 10RAKR picks up, its contact *a* opens to transmit an indication to the control machine which releases the indication relay 10RAK in the machine.

At the west end of the stretch, with relays 2RDR and 2RTFPR picked up, energy is supplied to relay 2LAKR over front contact *a* of relay 2RDR, front contact *d* of relay 2RTFPR, and front contact *b* of relay 1TKSR, so that relay 2LAKR is again picked up, causing indication relay 2LAK in the control machine to release.

From the foregoing, it will be seen that the cutting off of steady energy in the single track stretch and the subsequent supply of coded energy through the stretch from the east end to the west end thereof will cause, at the control location, relay 2LAK to be picked up and again released, while relay 10RAK becomes released at this time.

Additionally, relay 10LBKR, at the east end of the stretch, the purpose of which is to check the presence of steady energy at that end of the stretch, becomes released when the steady energy is cut off at that point, since front contact *b* of relay 6LTFPR will interrupt the circuit for energizing relay 10LBKR. This results in an indication code being transmitted to the control machine which results in the release of relay 10LBK in the machine.

At this time, with relay 10LBK released, and during the time that the indication relay 2LAK picks up and releases and prior to the release of relay 10RAK, a flash indication would exist in the indication lamps 2LAKE and 10RAKE on the machine, except for the provision of relay BKLO in the control machine, the purpose of which is to prevent such a flash indication. Turning now to a discussion of the control of this relay and the manner in which it prevents a flash indication, this relay will be energized when signal 2RA is to be cleared, since the picking up of relay 2RGS to send a control for clearing the signal will establish a circuit for picking up relay BKLO, which circuit may be traced from terminal B at front contact *c* of relay 10LBK, which will be picked up during the time that steady energy is still being received at the east end of the stretch, over front contact *d* of relay 2RGS, and through the winding of relay BKLO to terminal N. With contact *c* of relay BKLO picked up, neither indication lamp 2LAKE or 10RAKE can be lighted, since back contact *c* of relay BKLO interrupts the circuit for supplying energy to both of these lamps.

When relay 10LBK releases due to the removal of steady energy at the eastern end of the stretch, a stick circuit is established for relay BKLO which includes back contact *c* of relay 10LBK, back contact *d* of relay 2RBK, back contact *c* of relay 1TK, back contact *c* of relay 9TK, front contacts *c* of relays 2LAK and 10RAK in multiple, and front contact *a* of relay BKLO. Relay BKLO is selected and arranged to be sufficiently slow in releasing its contacts so that it bridges the interval during the time between the opening of its pickup circuit previously traced and the establishment of its stick circuit. As a result, relay BKLO will not be released when relay 10LBK releases. When relay 10LAK releases, its front contact *c* in the stick circuit of relay BKLO will open, but this circuit will be maintained over front contact *c* of relay 2RAK.

However, when the reversal of energization is finally completed, both relays 2LAK and 10RAK in the machine will be deenergized, so that their contacts *c* will interrupt the stick circuit for relay BKLO, and since contact *c* of relay 10LBK is released at this time, there is neither a pickup or stick circuit for relay BKLO established and its contact *c* will release. Thereafter, during any time that relays 2LAK or 10RAK are picked up, lighting circuits will be established over back contact *b* of relay 10LBK, back contact *b* of relay 2RBK, back contact *c* of relay BKLO, and over front contact *b* of relay 2LAK or 10RAK to light the lamp 2LAKE or 10RAKE, respectively.

At the control machine, at this time, the indication relay 2RHK is energized by energy supplied from terminal 10, as a result of the picking up of the contacts of signal control relay 2RAHR at the field location, so that relay 2RHK is energized and establishes a stick circuit for itself including its own front contact *a* and a back contact *e* of the delivery relay 1–2D. When contact *b* of relay 2RHK picks up, it interrupts the supply of energy to the indication lamp 2NKE, and supplies energy to the indication lamp 2RHKE, to thereby indicate to the operator that the signal at the west end of the stretch has cleared. Additionally, when the indication code is supplied to the machine to energize relay 2RHK, an additional circuit is established from terminal 19 of the office coding unit over front contact *f* of the delivery relay 1–2D, to further energize relay 2RGS over its front contact *a*. When contact *f* of relay 1–2D releases, the stick circuit including back contact *f* of relay 1–2D remains closed so that relay 2RGS is maintained picked up at this time.

It will now be assumed that the eastbound train for which signal 2RA has been cleared proceeds past this signal and therefore enters the stretch of single track extending between the head blocks.

When the train enters section 1T, relay 1TR releases and its front contact *c* interrupts the circuit for supplying energy to the winding of relay 1TKSR. Relay 1TKSR accordingly releases and its front contact *c* interrupts the supply of energy to the winding of relay 1TKSPR which also releases at this time. When contact *a* of relay 1TKSR releases it establishes a circuit for supplying energy to the lower winding of relay 2RHSR, to thereby restore the contacts of relay 2RHSR to their normal position. The circuit for relay 2RHSPR is interrupted at this time at front contact *b* of relay 1TKSPR as well as at contact *b* of relay 2RHSR. When contact *a* of relay 2RHSPR releases, it cuts off the supply of energy to the winding of relay 2RAHR and the contacts of this relay release, with back contact *a* establishing a circuit for supplying energy to the red lamp R of signal 2RA. At this time, a circuit is established for reenergizing relay 2RASR, which circuit may be traced from terminal B at back contact *a* of relay 2RBHR, over back contact *b* of relay 2RAHR, back contact *b* of relay 2RHSPR, back contact *b* of relay 1TR, and through the winding of relay 2RASR to terminal N. The picking up of contact *a* of relay 2RASR reestablishes the stick circuit for this relay. Contact *c* of relay 2RASR picks up to further interrupt the circuit for energizing relay 2RAHR, and contact *d* of relay 2RASR picks up in the circuit for supplying energy to the locking relay 1LR, but this circuit remains open at front contact *c* of relay 1TKSPR, so that the switch movement 1WM cannot be operated at this time with a train occupying the detector section.

The release of contact *c* of relay 1TKSR supplies energy to terminal 25 of the field unit 1–2 so that an indication code is transmitted to the control machine which results in the track indication relay 1TK picking up its contacts which remain picked up as a result of a stick circuit which is established at front contact *a* of relay 1TK and back contact *a* of the delivery relay at the end of the code. Additionally, the removal of potential from terminal 19 of the field unit 1–2 as a result of the release of front contact *c* of relay 2RAHR causes the signal indication relay 2RHK at the office to be released.

When contact *e* of relay 1TK in the control machine picks up, it interrupts the circuit for supplying energy to the windings of relays 2RG and 2RGS, and as a result these relays will release. Front contact *b* of relay 1TK establishes an obvious circuit for lighting track indication lamp 1TKE, while the release of contact *b* of relay 2RHK extinguishes the indication lamp 2RHKE and lights the indication lamp 2NKE, so that the operator is advised of the entrance of the train into the detector section and the restoration of signal 2RA to display its stop aspect.

At the field location at the west end of the stretch, the release of contact *b* of relay 1TKSR interrupts the supply of energy to the winding of relay 2LAKR, so that its contact *a* causes an indication code to be transmitted to the control machine which results in the pickup of relay 2LAK. With relay 2LAK picked up, energy is supplied to the approach indication lamp 2LAKE, over the circuit including back contact *b* of relay 10LBK, back contact *b* of relay 2RBK, back contact *c* of relay BKLO, and front contact *b* of relay 2LAK.

When the eastbound train enters section 2T, the wheels and axles of the train shunt the supply of coded energy from the winding of relay 2RTR, so that this relay releases its contacts and they remain released. This action results in the subsequent release of relays 2RTFPR, 2RTBPR, 2RHR and 2RDR, but the circuits governed by these relays which are of consequence at this time have already been interrupted by the entrance of the train into track section 1T, so that other than the further interruption of these circuits, no other action takes place as a result of the release of the mentioned relays.

When the rear of the eastbound train vacates section 1T, relay 1TR will be reenergized and its contacts will pick up. Assuming that no indication code has been stored for starting from the field unit 1–2, the indication code starting relay 1ST will have its contacts in the normal position and a circuit is established thereby from terminal B at an internal connection of the field unit 1–2, over terminal 27 of the field unit, normal contact *a* of relay 1ST, front contact *c* of relay 1TR, and through the winding of relay 1TKSR to terminal N. When relay 1TKSR picks up, its front contact *a* establishes a stick circuit for itself which may be traced from terminal B at front contact *a* of relay 1TKSR, over front contact *c* of relay 1TR, and through the winding of the relay to terminal N. Thus relay 1TKSR will remain picked up during any subsequent indication codes transmitted from field unit 1–2, until the next time that a train occupies section 1T. When contact *c* of relay 1TKSR picks up, it reenergizes relay 1TKSPR and its contacts pick up. Closing of front contact *c* of relay 1TKSPR causes the reenergization of the locking relay 1LR, so that its contacts *b* and *c* in the circuit for controlling the switch movement 1WM are closed, as well as front contacts *d* and *e* in the control circuit for relay 1WSR. Thus with the detector section unoccupied, a control code could be sent at this time to operate the switch 1W.

When contact *c* of relay 1TKSR picks up, an indication code is transmitted to the control machine to release the track indication relay 1TK. The release of contact *b* of relay 1TK interrupts the supply of energy to the track indication lamp 1TKE, so that the operator is advised that the eastbound train has vacated the detector section at the west end of the stretch. The release of contact *e* of relay 1TK reestablishes the connection to terminal N for the relays 2RG and 2RGS in the control machine, so that, if desired, the operator may position the signal lever 2GLO to the right to cause the transmission of a control code for reclearing signal 2RA. However, signal 2RA could not clear at this time, since the train is occupying the single track stretch and relay 2RHR at the field location is released, its contact *a* interrupting the circuit for energizing relay 2RHSPR which in turn controls the signal control relays.

At the field location at the west end of the single track stretch, the code transmitting relay 2RCR is now steadily energized by the circuit originally traced, since front contact *a* of relay 1TR is now closed. Accordingly, unless signal 2RA is recleared, steady energy will be supplied to the rails of section 2T at the west end of the stretch behind the eastbound train in section 2T.

Even though front contact *b* of relay 1TKSR at the west end of the stretch is now picked up, the circuit for energizing relay 2LAKR has been transferred over back contact *d* of relay 2RTFPR, which is released due to the train shunting section 2T, to the line wire 61, and since relay 2LTFPR is released at signal location 4S–5S, contact *f* of relay 2LTFPR maintains the line circuit deenergized so that relay 2LAKR remains released. Accordingly, the track occupancy lamp 2LAKE in the control machine remains lighted at this time to indicate the presence of a train in the western portion of the single track stretch.

When the eastbound train passes signal location 4S–5S, the supply of coded energy to the winding of relay 4RTR is cut off, and the contacts of this relay release and remain released. Accordingly, relays 4–5HR, 4–5DR, 4RTFPR, and 4RTBPR will all release. The release of contact *a* of relay 4–5HR interrupts the circuit previously traced for supplying energy to the winding of relay 4RSR, but this relay remains picked up at this time by a stick circuit including back contact *c* of relay 4RTFPR and front contact *a* of relay 4RSR. The sequence of release of the relays and the release time of relay 4RSR are selected so that the contacts of relay 4RSR do not release during the interval between the time of release of relay 4–5HR and the closing of back contact *c* of relay 4RTFPR, so that the contacts of relay 4RSR will remain picked up continuously at this time.

With contact *e* of relay 4RTFPR released, energy is supplied to the red lamp R of signal 4S, so that this signal displays a red or stop aspect behind the eastbound train.

When relay 4RTFPR releases, its front contact *d* interrupts the circuit for supplying energy to the winding of relay 4RTPR, and additionally interrupts the supply of energy over line wire 79 to deenergize relay 4LTPR at signal location 6S–7S. When relay 4LTPR at signal location 6S–7S releases, opening of its front contact *a* interrupts the circuit including line wire 91, for energizing relay 10RAKR at the right-hand or east end of the stretch. Contact *a* of this latter relay causes an indication code to be transmitted from the east end of the stretch which results in the pickup of relay 10RAK at the control machine. The picking up of contact *b* of relay 10RAK results in energy being supplied to the indication lamp 10RAKE, so that, at this time, both of the indication lamps 2LAKE and 10RAKE are lighted to indicate to the control operator that the train has entered the middle section, namely, section 4T, of the single track stretch.

When the rear of the eastbound train vacates section 2T, the steady energy supplied to the rails of section 2T at the west end thereof will be supplied to the winding of relay 2LTR, so that this relay picks up its contacts and keeps them picked up while steady energy is supplied to the winding thereof. As a result, the front contact repeater relay 2LTFPR picks up its contacts. During the period that the train occupied both section 2T and section 4T, a circuit was prepared for energizing the code transmitting relay 2LCR. This circuit may be traced from terminal B at back contact *c* of relay 2LTFPR, over back contact *a* of relay 2LSR, contact *a* of code transmitter 75CT, front contact *b* of relay 4RSR, back contact *b* of relay 4–5HR, back contact *d* of relay 2LTR, front contact *a* of relay 6NWPSR, back contact *b* of relay 2LSR, and through the winding of relay 2LCR to terminal N. However, when the train vacates section 2T, the circuit thus traced is opened at two points, namely, back contact *c* of relay 2LTFPR and back contact *d* of relay 2LTR. It will now be seen that, if the signal control relay at the west end of the stretch is operated to its reverse position by the transmission of a control code, for the reclearing of one of the entering signals to the stretch, the steady energy supplied to the west end of the stretch will be cut off, and accordingly the contacts of relays 2LTR and 2LTFPR at the east end of section 2T will be released. When these relays release, the circuit traced above will be established to cause a supply of coded energy at the 75 code rate to be transmitted over the rails of section 2T to the west end of the stretch, where the code following operation of track relay 2RTR at the 75 code rate will cause relay 2RHR to be energized, although relay 2RDR will remain deenergized. Under these conditions, the entering signals for the stretch can be cleared but will display only a yellow aspect, indicating that the next signal is at stop. It will thus be seen that the arrangement as shown provides for following moves into the single track stretch.

When the eastbound train moves past signal 6S, and enters section 6T, track relay 6RTR will be shunted and its contacts will release and remain released. In a manner similar to that described for the action which takes place when the train passes signal 4S and enters section 4T, the relays 6RTPFR, 6RTBPR, 6–7HR, and 6–7DR will all be released, but the stick relay 6RSR will remain picked up over the stick circuit including back contact *c* of relay 6RTFPR, and front contact *a* of relay 6RSR.

The release of contacts *e* of relays 6–7HR and 6RTFPR interrupts the circuit for supplying energy to the green lamp G of signal 6S and reestablishes the supply of energy to the red lamp R of the signal so that signal 6S displays a red or stop aspect behind the train.

The release of front contact *d* of relay 6RTFPR further interrupts the circuit for supplying energy to the winding of relay 10RAKR at the right-hand end of the stretch, so that this relay remains released and as a result the indication lamp 10RAKE at the control machine remains lighted.

It will now be assumed that the rear of the eastbound train vacates section 4T, so that the train is wholly contained within section 6T. At this time, a circuit has been established for supplying energy coded at the 75 code rate to the code transmitting relay 4LCR, this circuit being traced from terminal B at back contact *c* of relay 4LTFPR, over back contact *a* of relay 4LSR, contact *a* of code transmitter 75CT, front contact *b* of relay 6RSR, back contact *b* of relay 6–7HR, back contact *d* of relay 4LTR, back contact *b* of relay 4LSR, and through the winding of relay 4LCR to terminal N. Accordingly, because of the code following operation of relay 4LCR, impulses of energy coded at the 75 code rate will be supplied from the battery 4LTB to the rails of section 4T and these impulses operate relay 4RTR at the west end of section 4T at a corresponding rate.

When relay 4RTFPR at signal location 4S–5S picks up, its back contact *c* interrupts the stick circuit for relay 4RSR. Since relays 4RTFPR and 2LTFPR are both picked up at this time, the circuit for energizing relay 4RSR over front contact *a* of relay 4–5HR is open, so that relay 4RSR releases its contacts. A circuit is now established for energizing the winding of relay 4RCR by steady energy, which circuit is closed the next time that relay 4RTR releases during an off period of the 75 code being supplied to its winding at this time. When back contact *d* of relay 4RTR releases, energy is supplied to the winding of relay 4RCR by a circuit which may be traced from terminal B at front contact *c* of relay 2LTFPR, over back contact *c* of relay 2LSR, back contact *c* of relay 4–5HR, back contact *d* of relay 4RTR, back contact *c* of relay 4RSR, front contact *h* of relay 6NWPSR, front contact *c* of relay 6NWPR, and through the winding of relay 4RCR to terminal N.

It is to be noted that, even though front contact *a* of relay 4RTBPR may close, the code following operation of contact *b* of relay 4RTR cannot, with front contact *b* of relay 2LTR continuously closed, energize relay 4–5HR through transformer DT. Thus relay 4–5HR remains released and its back contact *c* will not interrupt the circuit just traced for relay 4RCR. When contact *a* of relay 4RCR picks up, it disconnects the winding of relay 4RTR from the rails of section 4T so that contact *d* of relay 4RTR remains released to continue the steady energization of relay 4RCR. The steady energy supplied from battery 4RTB will feed over the section rails to the east end of section 4T during the intervals between the supply of energy coded at the 75 code rate from battery 4LTB. In the next "off" interval when relay 4LCR is released, the winding of relay 4LTR will be connected across the rails of section 4T and will be energized by the steady energy supplied over section 4T from the west end thereof.

When contact *d* of relay 4LTR picks up, it interrupts the circuit for relay 4LCR, so that the contact *a* of this latter relay remains released to connect the winding of relay 4LTR across the rails of section 4T at this time. Relay 4LTFPR will be picked up when relay 4LTR picks up its contacts, to thus further interrupt the circuit for governing the code transmitting relay 4LCR.

It will now be apparent that if the control operator causes the transmission of a control code to clear the entering signals at the west end of the stretch, the steady energy supplied to the west end of the stretch to section 2T will be cut off, which will result in the steady energy supplied to the west end of section 4T being cut off, resulting in the release of relays 4LTR and 4LTFPR at the east end of section 4T. With these relays released, the circuit traced before for energizing the winding of relay 4LCR over the contact *a* of the code transmitter 75CT will be reestablished so that energy coded at the 75 code rate will be transmitted over section 4T to clear signal 4S. This will cause energy at the 180 code rate to be transmitted from the east end of section 2T, since relay 2LCR is controlled over contact *b* of relay 4–5HR and contact *a* of transmitter 180CT, to cause the code following operation of relay 2RTR at the west end of the stretch, to thereby clear the entering signal. Since the frequency of the coded impulses in section 2T is at the 180 code rate, relay 2RDR will be energized at the west end of the stretch so that signal 2RA or 2RB, whichever happens to be cleared, will display a green or clear aspect.

It can thus be seen that as the train progresses through the stretch, steady energy is supplied behind the train, in such manner that if the steady energy is cut off at the entering end of the stretch, the signals will reclear appropriately behind the train to permit following moves into the stretch.

At this time, with the train wholly contained within section 6T, and with steady energy being supplied at the west end of section 2T and also at the west end of section 4T, relay 4LTFPR will be picked up at signal location 6S–7S, so that front contact *f* of this relay establishes a circuit including the line wire 79 for energizing relays 4LTPR and 4RTPR. The circuit for energizing relay 10RAKR at the east end of the stretch over line wire 91 continues to be interrupted by front contact *d* of relay 6RTFPR at this time, so that relay 10RAK in the control machine remains picked up to maintain the indication lamp 10RAKE lighted.

When relay 4RTPR at signal location 4S–5S picks up, a circuit is established for energizing relay 2LAKR at the west end of the stretch, which circuit may be traced from terminal B at front contact *a* of relay 4RTPR, over front contact *f* of relay 2LTFPR, line wire 61, back contact *d* of relay 2RTFPR, front contact *b* of relay 1TKSR, and through the winding of relay 2LAKR to terminal N. Accordingly, relay 2LAK will be released in the control machine and the opening of front contact *b* of this relay will interrupt the supply of energy to lamp 2LAKE, so that the operator is thereby notified that the train has progressed through the left-hand portion and middle section of the single track stretch and now occupies only the right-hand portion of the single track stretch.

When the eastbound train passes signal 10RA, track relay 9TR will be shunted and its contacts will release. Contact *a* of relay 9TR interrupts the circuit for energizing relay 6LCR, which accordingly ceases operation. Contact *c* of relay 9TR interrupts the circuit for energizing relay 9TKSR, and this relay releases followed by the subsequent release of relay 9TKSPR, to deenergize the relay 10RAHR which is controlled in a manner not shown so as to be responsive to the occupancy of section 9T. The release of contact *c* of relay 9TKSR causes the transmission of an indication code to the control machine, where the track indication relay 9TK becomes picked up to thereby cause the track indication lamp 9TKE to be lighted to indicate to the operator that the train has occupied section 9T. By means not shown, the stop indications of signals 10RA and 10RB may be displayed in a manner similar to that previously described for signal 2RA to indicate to the control operator that this signal has also been placed at stop.

When the rear of the eastbound train vacates section 6T, no action will take place, until the rear of the train has passed out of the detector section 9T, at which time track relay 9TR will again pick up its contacts. With contact *a* of relay 9TR picked up, the circuit for energizing relay 6LCR is again completed except that with relay 10RAHR released, relay 6LCR will operate its contacts at the 75 code rate, to thereby start the transmission of coded energy at the 75 code rate westward over the rails of section 6T.

When the first impulse of coded energy is supplied to the winding of relay 6RTR, the contacts of this relay will pick up and front contact *a* of relay 6RTR will energize relay 6RTFPR which will pick up immediately. As pointed out previously in connection with the train movement out of section 4T, this action will result in the release of the directional stick relay 6RSR, so that a circuit is established for energizing relay 6RCR by steady energy, when the contact *d* of relay 6RTR releases during the next "off" interval of the 75 code energy supplied to its winding. The steady energy transmitted eastward over the rails of section 6T will cause relay 6LTR to pick up during the next time that contact *a* of relay 6LCR is released, and when back contact *a* of relay 6LTR opens, it interrupts the circuit for the relay 6LCR, so that relay 6LTR remains connected across the rails at this time. Front contact *b* of relay 6LTR establishes a circuit for energizing relay 6LTFPR, but the control circuit for relay 6LTBPR remains open at back contact *b* of relay 6LTR. Additionally, if no indication code is being transmitted from the field unit 9–10 at the time the train vacates section 9T, the closing of front contact *c* of relay 9TR will reestablish a supply of energy to the winding of relay 9TKSR and its contacts will pick up, contact *c* of this relay establishing the energizing circuit for relay 9TKSPR which also picks up. The picking up of contact *c* of relay 9TKSR results in the transmission of an indication code to the office to release track indication relay 9TK, to thereby extinguish the track indication lamp 9TKE, indicating to the operator that the train has passed out of the detector section 9T.

The presence of steady energy at the east end of the stretch is indicated by the energization of relay 10LBKR over the circuit which may be traced from terminal B at back contact *a* of relay 6LTBPR, front contact *b* of relay 6LTFPR, reverse contact *a* of relay 10LFSR, front contact *a* of relay 9TKSPR, and through the winding of relay 10LBKR to terminal N. When contact *a* of relay 10LBKR picks up, an indication code is transmitted to the control machine which causes relay 10LBK in the control machine to be picked up.

At the control point, the picking up of contact *b* of relay 10LBK interrupts the circuit for supplying energy to the lamps 2LAKE and 10RAKE, so that even though relay 10RAK is picked up at this time, the circuit for supplying energy to the lamp 10RAKE is interrupted with the result that an indication is displayed that the eastern portion of the single track stretch has become vacant.

The apparatus is now restored to the condition shown in the drawings, in which the single track stretch is unoccupied, with the traffic direction set up for eastward train movements, and with steady energy being supplied through the various track sections in the single track stretch from the west end thereof to the east end thereof, and with the indications restored to the condition shown in the drawings on the control machine.

It will now be assumed that the operator desires to clear a signal at the east end of the stretch for a westward train movement. Accordingly, the operator moves signal lever 10GLO to its left-hand position, and presses the starting button 9–10 STB to thereby initiate a control code to reverse the direction of traffic in the single track stretch and to clear the entering signal, in this case assumed to be signal 10LA, since switch 9 will be assumed to remain in its normal position.

A number of actions take place in the circuitry associated with the control machine, and this operation will be described before turning to the description of the apparatus in the field.

With the contact *a* of signal lever 10GLO in its left-hand position, and contact *a* of signal lever 2GLO in its normal position, circuits are established at this time for energizing relay FS and for reversing the contacts of the polar traffic relay 2–10F. A first circuit may be traced from terminal B at back contact *d* of relay 9TK, over back contact *e* of relay 10LGS, back contact *d* of relay 6WLSK, back contact *b* of relay 6WLP, back contact *e* of relay 2RGS, back contact *d* of relay 1TK, front contact *e* of relay 10LBK, contact *a* of lever 2GLO closed in the normal or left position, contact *a* of lever 10GLO closed in the left position, reverse contact *b* of relay 2–10F, back contact *d* of relay FS and through the winding of relay FS to terminal N. Accordingly, relay FS will pick up and its contact *d* is assumed to be of the make-before-break type so that, when this contact picks up, a stick circuit for relay FS is established before the pickup circuit is opened. The stick circuit for relay FS connects the winding of this relay to terminal B through back contact *b* of relay 1–2ST, back contact *b* of relay 9–10ST, and the back contact *b* of relay BKLO, all connected in multiple. When the contacts of relay FS pick up, a circuit including the circuit previously described for energizing relay FS up to and including contact *a* of lever 10GLO and additionally including front contact *b* of relay 9–10STBP and front contact *c* of relay FS is closed to the upper winding of relay 2–10F, and through the winding to terminal N. The energization of this circuit causes the contacts of the polar stick relay 2–10F to move to their left-hand or normal position. When lever 10GLO is positioned to the left and push button 9–10STB is operated, contact *d* of lever 10GLO establishes a circuit for energizing relay 10LG, which circuit may be traced from terminal B at contact *d* of lever 10GLO, over front contact *c* of relay 9–10STBP, which is picked up when the push button 9–10STB is operated, through the winding of relay 10LG, and over back contact *e* of relay 9TK to terminal N. When relay 10LG picks up, its front contact *a* establishes a stick circuit for the relay which includes front contact *a* of relay 10LG, and contact *d* of lever 10GLO. When contact *c* of relay 9–10STBP releases, an additional stick circuit is established for relay 10LG, so that thereafter inadvertent operation of the lever 10GLO will not cause the release of relay 10LG to inadvertently transmit a control code to place signal 10L at stop. When relay 10LG picks up, a circuit is established for energizing relay 10LGS, which circuit may be traced from terminal B at front contact *a* of relay MP, which relay is picked up when a control code is to be transmitted from either of the office control units to the field locations, over back contact *d* of relay 6WLRK, back contact *g* of relay 6WLP, normal contact *c* of relay 2–10F, front contact *e* of relay 9–10S, which is picked up when the control code has selected station 9–10 for the transmission of function controls, front contact *b* of relay 10LG, through the winding of relay 10LGS, and over back contact *e* of relay 9TK to terminal N. When contact *a* of relay 10LGS picks up, it establishes a stick circuit including back contact *f* of relay 9–10D and front contact *a* of relay 10LGS to maintain relay 10LGS energized.

Additionally, when contact *a* of relay 2–10F moves to its normal position, the eastward traffic indication lamp RFKE is extinguished, and the westward traffic indication lamp LFKE is lighted to indicate that the direction of traffic is being set up in the westward direction in the single track stretch.

When the push button 9–10STB is operated and relay 9–10STBP picks up as a result, a circuit is established for energizing the winding of relay 9–10ST over front contact *a* of relay 9–10STBP, for starting the transmission of a control code to field unit 9–10. Additionally, a circuit is established for supplying energy to the winding of relay 1–2ST for starting the transmission of a control code to field unit 1–2, the latter circuit being traced from terminal B at front contact *d* of relay 9–10STBP, over front contact *f* of relay FS, and through the winding of relay 1–2ST to terminal N. As hereinbefore described, these relays pick up and remain picked up until such time as the appropriate control code has been sent to the respective field locations, at which time the relays are released.

It will be seen from the foregoing that at this time, with the signal lever 10GLO operated to the left and the push button 9–10STR having been operated, the machine circuits have acted to cause the transmission of control codes to both field units 1–2 and 9–10 at opposite ends of the single track stretch. The character of these control codes will now be explained as to the manner in which they enter into the reversal of traffic movement in the stretch.

With the starting relays for both field station control codes picked up, and the traffic stick relay FS picked up, a circuit is established for energizing relay BKLO at this time, which circuit may be traced from terminal B at front contact *c* of relay 1–2ST, over front contact *c* of relay 9–10ST, front contact *a* of relay FS and through the winding of relay BKLO to terminal N. Accordingly, relay BKLO will pick up its contacts, and as a result back contact *d* of relay BKLO and back contact *e* of relay FS are both opened in the negative return from the windings of relays 2RBK and 10LBK, so that relay 10LBK releases. With relays 10LBK and 2RBK both released, a stick circuit is established for relay BKLO which includes back contact *c* of relay 10LBK, back contact *d* of relay 2RBK, back contact *c* of relay 1TK, back contact *c* of relay 9TK, front contact *c* of relay 10RAK, and front contact *a* of relay BKLO. Thus front contact *e* of relay 10LBK in the circuit for controlling the traffic relay 2–10F is opened to prevent operation of the traffic relay at this time, and, additionally, relay BKLO is maintained energized to prevent the possibility of flash indications on the track lights 2LAKE and 10RAKE while traffic is being reversed in the field. All three paths of the stick circuit for relay FS are now open and this relay releases.

The circuits governed by the traffic relay 2–10F in the control machine, which are arranged to transmit control codes to each of the field locations at opposite ends of the single track stretch, are arranged in such manner that the traffic relays such as relay 10LFSR at the right-hand end of the stretch and relay 2RFSR at the left-hand end of the stretch operate their contacts to positions which are in accordance with the position of the contacts of the traffic relay in the machine. As here shown, the circuits are arranged so that, when the contacts *d* and *e* of relay 2–10F in the control machine are positioned to the right, energy is supplied to the terminals 39 and 37 of the office coding unit 9–10 and through the code communication system to energize the terminals 37 and 39 at the field unit 9–10 to cause the traffic relay 10LFSR to have its contacts positioned to the right. When the contacts of relay 2–10F in the control machine are operated to their left-hand position, the relay 10LFSR will have its contacts operated to their left-hand position, by means not shown, but which may be arranged similarly to those shown in the drawings for positioning the contacts to their right-hand position, or may be through the medium of the code communication system in the manner illustrated in the aforementioned Manual 506A.

In similar fashion, when the contacts *d* and *e* of relay 2–10F are operated to their left-hand position, a circuit is established for energizing relay 2RFSR at the west end of the stretch to position the contacts of this relay to their left-hand position, but when the contacts *d* and *e* of relay 2–10F in the control machine occupy their right-hand position, the contacts of relay 2RFSR at the west end of the stretch are operated by means not shown to their right-hand position.

At this time, therefore, when the station selection relays 9–10S and 1–2S pick up during the control codes transmitted by the starting action previously described, the traffic relays at the field locations will operate their contacts to positions opposite to that in which they are shown.

When contact *a* of relay 10LFSR moves to its left-hand position, it interrupts the circuit for energizing relay 10LBKR, so that as a result relay 10LBK in the control machine will continue to remain released, this relay having previously been released by the energization of relays FS and BKLO. With contact *b* of relay 10LFSR operated to its left-hand position, the circuit previously employed for supplying coded energy to the winding or relay 6LCR is opened further at this point, so that relay 6LCR cannot be energized to supply coded energy to section 6T at this time even if the remainder of the circuit should be closed.

At the west end of the stretch, which is now the selected exit end for westward train movements, relay 2RFSR will operate its contacts to their normal or left-hand position. Contact *a* of relay 2RFSR in the circuit for supplying energy to the winding of relay 2RBKR is closed at this time, but the circuit for this relay remains open at front contact *b* of relay 2RTFPR.

When contact *b* of relay 2RFSR moves to its left-hand position, the supply of steady energy to the winding of the code transmitting relay 2RCR is cut off, and in its stead, energy coded over contacts of the 180CT or 75CT code transmitter is supplied to the winding of the transmitting relay in accordance with the aspect displayed by signal 2LA. Assuming that the signal 2LA has been cleared for the westward train movement, the circuit for energizing the winding of relay 2RCR at this time may be traced from terminal B at contact *a* of code transmitter 180CT, over front contact *a* of relay 2LAHR, back contact *c* of relay 2RTFPR, front contact *a* of relay 2RFSPR, normal contact *b* of relay 2RFSR, front contact *b* of relay 2RASR, front contact *a* of relay 1TR, back contact *a* of relay 2RTR, through the winding of relay 2RCR to terminal N. Accordingly, the contacts of relay 2RCR will be operated at the 180 code rate to thereby supply impulses of coded energy eastward over the rails of section 2T from the left-hand or west end thereof.

At the intermediate location 4S–5S, the reception of impulses of coded energy at the 180 code rate by the winding of relay 2LTR will cause the contacts of this relay to be operated at a corresponding rate. Accordingly, relay 2LTBPR will now be picked up and energy will be supplied to the decoding transformer DT so that relay 4–5HR will pick up its contacts. Additionally, since the energy supplied to the primary winding of the decoding transformer DT is at the 180 code rate, sufficient energy will be received by the clear control relay 4–5DR so that its contacts will also pick up.

Relay 2LSR will be picked up at this time by the circuit which may be traced from terminal B at front contact *a* of relay 4–5HR, over back contact *b* of relay 4RTFPR, front contact *b* of relay 2LTFPR, and through the winding of relay 2LSR to terminal N.

At this time, with relay 2LTFPR picked up, relay 4–5HR picked up, and relay 4–5DR picked up, an obvious circuit is established for supplying energy to the green lamp G of signal 5S so that this signal displays a green or proceed aspect.

Relay 4RCR is energized at this time by a circuit including front contact *b* of the code transmitter 180CT, the circuit extending from terminal B over back contact *c* of relay 4RTFPR, back contact *a* of relay 4RSR, contact *b* of code transmitter 180CT, front contact *c* of relay 4–5HR, back contact *d* of relay 4RTR, back contact *c* of relay 4RSR, front contact *h* of relay 6NWPSR, front contact *c* of relay 6NWPR, and through the winding of relay 4RCR to terminal N. Accordingly, coded energy at the 180 code rate is supplied to the rails of section 4T at the west end thereof and flows eastward over the rails to cause the code following operation of track relay 4LTR at the east end of section 4T. In a manner similar to that described in connection with signal location 4S–5S, the code following operation of relay 4LTR will cause relays 4LTFPR, 4LTBPR, 4LSR, 6–7HR, and 6–7DR to be energized, with the result that signal 7S displays a green or clear aspect and the code transmitting relay 6RCR is energized by energy coded at the 180 code rate to cause the transmission of coded impulses at the same rate over the rails of section 6T to the eastern end of the single track stretch.

Relay 6LTR at the east end of the single track stretch operates its contacts at the rate of 180 operations per minute in response to the energy supplied to the winding of the relay over the rails of section 6T. This operation results in the energization of relays 6LTFPR, 6LTBPR, 10LHR, and 10LDR.

With the code energy being received at the right-hand or eastern end of the section, conditions are now such that the entering signal 10LA or 10LB may be cleared depending upon the position of the track switch 9W, which in this case will be assumed to be normal.

At the control office, when the contacts of relay 2–10F operated to their left-hand position and with the signal lever 10GLO in its left-hand position, the relays 10LG and 10LGS were picked up as previously described. When the control code for positioning the traffic relays in the field was transmitted, additional code steps were provided for reversing the signal control relay 10LHSR at the eastern end of the stretch, these circuits being substantially similar to those previously described for relay 2RHSR, and therefore their detailed description is deemed unnecessary.

Relay 10LHSR having its contacts in their reverse position, a circuit is now established for clearing signal 10LA, by the energization of signal control relay 10LAHR. First, relay 10LHSPR is picked up by a circuit including normal contact *d* of relay 10LFSR, reverse contact *b* of relay 10LHSR, front contact *a* of relay 10LHR, back contact *a* of relay 9RWCR, front contact *a* of relay 9NWCR, front contact *b* of relay 9TKSPR, and the winding of relay 10LHSPR.

When relay 10LHSPR picks up, its back contact *b* interrupts the circuit for energizing the signal locking relay 10LASR, with the result that the contacts of this relay release. The release of contact *d* of relay 10LASR causes the release of the switch locking relay 9LR, so that switch 9W cannot be operated at this time. With contact *a* of relay 9LR released, a circuit is established including this back contact, back contact *c* of relay 10LASR, back contact *b* of relay 10TER, front contact

*a* of relay 10LHSPR, front contact *c* of relay 99NWCR, and the winding of relay 10LAHR for energizing relay 10LAHR.

With contact *a* of relay 10LAHR and contact *b* of relay 10LDR picked up, an obvious circuit is established for supplying energy to the green lamp G of signal 10LA, so that this signal displays a green or clear aspect for a westbound train.

The operation of the apparatus as the train enters the single track stretch at the eastern end, and moves through the various track sections to the west end and vacates the stretch is similar to that described previously for the eastbound train movement and it is believed that a detailed description of the circuit operation under these conditions is unnecessary, since the symmetry of the circuits will readily provide an understanding of the circuit operation for the westbound train, when considered in the same sequence as the progress of the eastbound train previously described. It is to be noted that steady energy will be supplied to the rails of the track sections in the rear of the westbound train, so that when the westbound train vacates the single track stretch, each of the track circuits is energized with steady energy from the east end of the stretch to the west end of the stretch, and the reception of this steady energy et the west end of the stretch will provide a suitable block clear indication in the control machine to permit subsequent reversal of traffic to the eastbound direction if so desired.

I shall now describe the operation of the system embodying my invention under various conditions involved where a train enters or leaves the single track stretch through a hand-operated switch governed by an electric switch lock. In connection with such operation, it can be pointed out that, in general, the circuits are arranged so that any initial operation by a member of the train crew prior to the unlocking of the switch will not result in putting a signal to stop for an established route for the single track stretch or place a signal at stop in the face of an approaching train. The electric switch lock is under the control of the operator for moves either to or from the main track. Moves from the main track are established by providing a suitable time interval from the time that the track section in which the lock is located is occupied by a train, and moves out of the siding onto the single track stretch are governed by transmission of coded energy from each end of the single track stretch in order to obtain approach locking for the electric switch lock. Additionally, the circuits are arranged so that after the switch lock has been released the unlocked condition will be retained until the hand-throw switch has been placed normal and the initiating circuits restored to their normal condition. These functions are all accomplished with a minimum number of line wires extending between the switch lock location and the control locations.

In describing the detailed operation of the switch lock control circuits, it will first be assumed that a train on the siding wishes to enter the single track stretch through the switch governed by electric switch lock 6WL and to thereafter proceed to either the east end or west end of the single track stretch. The train crew of the train in the siding will communicate with the operator, by the usual telephone system provided in such railway signaling arrangements, and inform the operator of the fact that they desire to enter the single track stretch at the switch lock location 6WL, and to thereafter traverse the single track stretch to leave the stretch either at the east end or west end thereof.

Assuming that there is no conflicting train movement at the time, the control operator will position the switch lock control lever 6WLO on the control machine from its normal to its reverse position. Operation of the starting push button 1–2STB will cause the initiation of the transmission of a control code to the field unit 1–2, and when the station selection relay 1–2S picks up to designate the field unit 1–2 as the field location to receive the control code, front contacts *e* and *f* of relay 1–2S establish a circuit for reversing the polarity of the energy supplied to the switch lock control relay 6WLSR at the west end of the single track stretch. With the contacts of relay 6WLSR operated to their reverse position, energy is supplied to line wire 63 from terminal B over reverse contact *a* of relay 6WLSR. The line wire 67, as previously pointed out, is one of the common wires extending through the stretch and connected to the negative terminal of each of the batteries provided at the various locations.

At signal location 4S–5S, where the major portion of the apparatus involved in the control of the electric switch lock 6WL is located, the presence of energy on line wire 63 energizes relay 6WLSPR, over a back contact *a* of relay 6WLPAR with the result that relay 6WLSPR picks up.

At the switch lock location, a train crewman will have operated the initiating switch 6WLSW, which, as pointed out hereinbefore, may be contacts operated by the removal of a padlock in the electric switch lock mechanism, or may be contacts actuated by the opening of a door or other cover to gain access to the switch lock operating handle, but in any event, these contacts form a preliminary circuit actuator for the use of the train crew. When contact *b* of switch 6WLSW is opened, the supply of energy to line wire 71 is interrupted, and as a result, relay 6WLPR which is energized from the line circuit over a back contact *b* of relay 6WLSPR, or over front contact *b* of relay 6WLSPR and front contact *d* of relay 6WLPR, will be deenergized and its contacts will release.

Before permitting further operation of the circuits, it is necessary to check at this time that noncoded or steady energy is being supplied to the track circuits in the stretch, to insure that the entering signals have not been cleared for a traffic movement. This function is accomplished by relay 6SEPR, which is energized as a result of the operation of a thermal time element relay SETER, the thermal time delay relay SETER being utilized to insure that relay 6SEPR is not energized due to any transient condition but that steady energy is applied for a predetermined amount of time to the circuits involved before relay 6SEPR can be energized.

Relay SETER is energized at this time by a circuit which may be traced from terminal B at front contact *a* of relay 6WLSPR, over back contact *a* of relay 6WLPR, back contact *c* of relay 6WLTPR, back contact *b* of relay 2LTBPR, front contact *g* of relay 6NWPSR, front contact *e* of relay 2LTFPR, back contact *b* of relay 6WLSCR, back contact *c* of relay 6SEPR, and through the heater winding of relay SETER to terminal N. After a suitable time interval, the contact *b* of relay SETER will close, and energy is then supplied over the circuit previously traced to the winding of relay 6SEPR, which then picks up its contacts. When front contact *c* of relay 6SEPR closes, it establishes a stick circuit which by-passes contact *b* of relay SETER, and the back contact *c* of relay 6SEPR interrupts the supply of energy to the heater winding of relay SETER.

With relay 6SEPR picked up and relay 6WLPR released, the circuit for energizing relay 6NWPSR is open at back contact *a* of relay 6SEPR and front contact *b* of relay 6WLPR, so that relay 6NWPSR releases. The opening of front contact *g* of relay 6NWSPR interrupts the stick circuit of relay 6SEPR which, thus deenergized, shortly releases. The release of contact *d* of relay 6NWPSR establishes a circuit for transitting an indication to the control machine, which circuit may be traced from terminal B at back contact *d* of relay 6WLTPR, over back contact *d* of relay 6NWPSR, line wire 65, and through the winding of relay 6WLKR to terminal N. When contact *a* of relay 6WLKR picks up, an indication code is transmitted to the control machine which results in the energization of relay 6WLRK in the control machine.

Relay 6WLSK in the control machine was previously energized as a result of the operation of relay 6WLSR at the left-hand end of the stretch, the reverse contact *c* of relay 6WLSR governing the indication code which operates relay 6WLSK. With contact *b* of relay 6WLSK picked up, the indication lamp 6WLNKE is extinguished, and with contact *b* of relay 6WLRK picked up, the indication lamp 6WLSKE is lighted.

At this time, relay 6WLP in the control machine is energized by a circuit which may be traced from terminal B at front contact *c* of relay 6WLRK, over back contact *b* of relay 2RGS, through a contact *b* of lever 2GLO closed in the normal or left-hand position, a reverse contact *a* of the switch lock lever 6WLO, and a contact *b* of lever 10GLO closed in the normal or right-hand position, over back contact *d* of relay 10LGS, and through the winding of relay 6WLP to terminal N. This circuit insures that relay 6WLP can only be picked up if no preliminary operations have taken place to clear a signal for entering the stretch, and also to insure that the preliminary indication has been received from the switch lock location that steady energy is present at that location. When relay 6WLP picks up, its front contact *a* establishes a stick circuit including front contact *c* of relay 6WLSK, to maintain the relay energized.

Relay 6WLST in the control machine is a slow acting repeater relay of relay 6WLP. Certain energizing circuits for the code starting relays 1–2ST and 9–10ST include so-called "out of correspondence" circuit arrangements comprising contacts *a* and *i* of relays 6WLST and 6WLP, respectively, in the pickup circuit for relay 1–2ST, and contact *j* of relay 6WLP and contact *b* of relay 6WLST in the pickup circuit for relay 9–10ST. It will be apparent, therefore, that at this time, when the contacts of relay 6WLP pick up, momentary circuits are established before the picking up of relay 6WLST, which afford a momentary energizing circuit for each of the starting relays 1–2ST and 9–10ST for transmitting control codes to the opposite ends of the single track stretch.

When a move is to be made out of a siding onto the single track stretch at a switch lock location, it is necessary to have coded track energy fed from each end of the stretch in order to obtain the unlocking of the electric switch lock. It is also necessary to maintain the supply of coded energy fed from each end of the single track stretch until the train has completed its move throughout the stretch. Otherwise, the train would receive stop aspects at all intervening intermediate signals, if the coded energy at the exit end of the switch toward which the train is proceeding was to be cut off. It follows therefore that it is necessary to provide at this time means for operating the traffic relays at both ends of the single track stretch to the positions in which they will be capable of causing a transmission of coded energy to the stretch at each end thereof.

This function is accomplished by means of front contacts *e* and *f* of relay 6WLP which bridge the contacts *d* and *e* of the traffic relay 2–10F, so that regardless of the position of the traffic relay, the control codes transmitted to field locations at each end of the stretch are such as to position the traffic relays at those points to the position in which they govern the supply of coded energy to the windings of their associated code transmitting relays.

The stick circuit for relay 6WLP further includes a back contact *d* of relay 10LBK and a back contact *e* of relay 2RBK, in multiple with the front contact *c* of relay 6WLSK, as previously described, the purpose of the BK relays in the additional stick circuit being to insure that relay 6WLP will remain picked up even after relay 6WLSK has been restored to its normally released position by the relocking of the electric lock in the field. In this manner relay 6WLP is maintained energized until such time as steady energy is again received at one or the other end of the single track stretch, indicating that the train which moved out of the siding and through the single track stretch has vacated the stretch.

Again considering the action of the circuits at the signal location 4S–5S which are involved in the control of the switch lock, it will be noted that the release of relay 6NWPSR causes the interruption of the circuits for the code transmitting relays 2LCR and 4RCR, the circuit for relay 2LCR being interrupted by front contact *a* of relay 6NWPSR and the circuit for relay 4RCR being interrupted at front contact *h* of relay 6NWPSR. Accordingly, at this time, relay 4RCR, which had been energized to transmit steady energy eastward through section 4T is now deenergized with the result that the steady energy in this section is cut off.

As previously explained, the cutting off of steady energy at the west end of section 4T will result in the cut off of the supply of steady energy at the westward end of section 6T, and when the relays at the east end of the single track stretch release, the previously traced circuit for energizing relay 6LCR is established, to transmit coded energy from the east end of the stretch toward the west end of the stretch, the code rate depending upon whether signal 10RA is at stop or has been cleared for a train movement.

Reception of the coded energy at the west end of section 6T causes the signal 6S to clear, and causes the transmission of coded energy from the east end of section 4T to the signal location 4S–5S, so that at this location, relays 4RTFPR, 4RTBPR, and possibly 4–5HR become picked up. At the west end of the stretch, the positioning of the traffic relay 2RFSR to its left-hand position causes the transmission of coded energy from the west end of section 2T, which when received at the east end of section 2T causes the code following operation of track relay 2LTR and the consequent pick up of the repeater relays 2LTFPR and 2LTBPR. At this time, it will be apparent that relays 2LTFPR, 4RTFPR, 2LTBPR, and 4RTBPR will be energized as a result of the coded energy being fed from each end of the single track stretch to the signal location 4S–5S. With both relay 2LTBPR and relay 4RTBR picked up, the circuit for supplying energy to the primary winding of transformer DT is interrupted at contacts *a* of these relays. Thus relay 4–5HR receives no energy from the secondary winding and this relay remains released or, if energized when relay 4RTR initially receives coded energy, releases. With relay 4–5HR released, signals 4S and 5S continue to display a red or stop aspect.

With relays 2LTBPR and 4RTBPR now picked up and relay 6SEPR released, a circuit is established for energizing relay 6WLSCR, which circuit may be traced from terminal B at front contact *a* of relay 6WLSPR, over back contact *a* of relay 6WLPR, back contact *c* of relay 6WLTPR, front contact *b* of relay 2LTBPR, front contact *b* of relay 4RTBPR, back contact *f* of relay 6NWPSR, back contact *b* of relay 6SEPR, back contact *a* of relay SETER, and through the winding of relay 6WLSCR to terminal N. When front contact *a* of relay 6WLSCR closes, it establishes a by-passing stick circuit around back contact *b* of relay 6SEPR and back contact *a* of relay SETER. Relay SETER is now supplied with energy by a circuit including front contact *b* of relay 6WLSCR and back contact *c* of relay 6SEPR, so that the thermal relay is set into operation for a second cycle. After a predetermined time interval determined by the construction and setting of the time element relay, the front contact *b* of relay SETER closes, to thereby energize the winding of relay 6SEPR which then picks up, front contact *c* of relay 6SEPR establishing a stick circuit around the front contact *b* of relay SETER and the back contact *c* cutting off the supply of energy to the heater winding of the thermal relay. The purpose of operating the thermal timing relay SETER through a second cycle after the picking up of relay 6WLSCR is to insure that the coded energy will be received for a predetermined interval before further unlocking action can take place, in order to guarantee against false operation by transient conditions.

With relays 6WLSCR and 6SEPR picked up at this time, a circuit is established for energizing relay 6WLPAR, which circuit may be traced from terminal B at the winding of relay 6WLPAR, through the winding of the relay, over front contact *c* of relay 6WLSCR, front contact *d* of relay 6SEPR, back contact *d* of relay 6WLPR, front contact *b* of relay 6WLSPR, line wire 71, through the winding of relay 6WLPBR, and over contact *a* of the switch 6WLSW to terminal N.

As a result both relays 6WLPAR at signal location 4S–5S and 6WLPBR at the switch lock location are energized and their contacts picked up. Front contact *b* of relay 6WLPAR establishes a by-passing or stick circuit around the front contacts of relays 6WLSCR and 6SEPR in the circuit just traced. The purpose of this stick circuit is to insure that relay 6WLPAR will continue to be energized, after the train has moved out of the siding track and onto the main line stretch, when the interruption of the coded energy will cause the release of the code detecting relays with a subsequent release of relay 6WLSCR. The opening of back contacts *c* and *d* of relay 6WLPAR, and also back contacts *a* and *b* of relay 6WLPBR, interrupts the circuit for relay 6NWPR, which then releases. The release of relay 6NWPR serves no useful purpose at this time, although its front contacts *b* and *c* open the circuits for relays 6NWPSR and 4RCR, respectively, at another point.

At this time, the operator may return the lever 6WLO in the machine to its normal position, thus transmitting a control code to station 1–2 which returns relay 6WLSR to its normal position. Although the opening of reverse contact *a* of this relay interrupts the initial energizing circuit for relay 6WLSPR, this latter relay is now energized over front contact *a* of relay 6WLPAR. This direct control circuit removes the control of relay 6WLSPR from the operator and assures that, once the switch unlock control has been obtained, it cannot be removed until the switch has been placed in its normal position and the electric switch lock restored to its normal condition.

The restoration of relay 6WLSR to its normal position assures that any other electric switch lock which may be located elsewhere in this single track stretch cannot now be released to permit a second train to enter the single track stretch after the first train has obtained permission to occupy the main track. The opening of reverse contact *c* of relay 6WLSR causes an indication to be transmitted to the office to release relay 6WLSK. Closing of back contact *b* of this latter relay again energizes lamp 6WLNKE so that both switch lock lamps are lighted at this time. Opening of contact *a* of lever 6WLO interrupts the pickup circuit for relay 6WLP but this relay remains energized over its second stick circuit including back contacts *d* and *e* of relays 10LBK and 2RBK, respectively.

At this time, a circuit is established for energizing the switch lock magnet 6WLM at the switch lock location, which circuit may be traced from terminal B at front contact *c* of relay 6WLPAR, over line wire 73, front contact *a* of relay 6WLPBR, through the magnet winding, over front contact *b* of relay 6WLPBR, line wire 75, and front contact *d* of relay 6WLPAR to terminal N. Accordingly, the armature of the switch lock will be energized so that the locking dog in the locking quadrant is removed with the result that the switch lock may now be operated to permit the hand-throw switch to be reversed and permit the train to move out of the siding and over the switch onto the main line.

It is to be noted that contact *b* of relay 6NWPSR is utilized in the lighting circuit for signal 4S, so that with contact *b* of relay 6NWPSR released, signal 4S can only display a red aspect irrespective of the conditions of the other controlling relays in the lighting circuit. This affords additional protection to the train entering the single track stretch from a siding.

At the time the train moves out on the single track stretch from the siding, it shunts the section 4T so that the coded energy being supplied westward over the section is cut off with the result that relays 4RTFPR and 4RTBPR at signal location 4S–5S are deenergized. When contact *a* of relay 4RTBPR releases, the circuit for supplying energy to the decoding transformer DT, previously traced, is established so that relay 4–5HR will now be picked up in response to the coded energy being supplied eastward over section 2T. Signal 5S will now display a yellow or green aspect depending on the frequency of the code being supplied from the west end of the stretch, to thereby afford a clear signal for the train if it is to move westward through the stretch. In a similar manner, the code being supplied from the eastern end of the stretch causes signal 6S to display a yellow or green aspect depending on the frequency of the code to thereby provide a clear signal for the train if it is to move eastward through the stretch.

The opening of front contact *b* of relay 4RTBPR interrupts the stick circuit for relay 6WLSCR, which then releases. The opening of front contact *b* of relay 6WLSCR interrupts the direct connection to terminal B for the existing stick circuit of relay 6SEPR and, since the circuit over the corresponding back contact is open at front contact *g* of relay 6NWSPR, relay 6SEPR is deenergized and releases. However, as previously mentioned, even though front contacts *c* and *d* of relays 6WLSCR and 6SEPR, respectively, are open, the stick circuit for relay 6WLPAR over its own front contact *b* bypasses these open front contacts and relays WLPAR and WLPBR remain energized.

The train having moved from the siding to the main track, the trainman will now restore the hand-throw switch and the electric switch lock to their normal positions, with the result that relays 6WLPBR and 6WLPAR are deenergized by the opening of contact *a* of switch 6WLSW and these relays release. This deenergizes the switch lock magnet 6WLM which in turn reenergizes relay 6NWPR. Relay 6WLSCR was deenergized when relay 4RTBPR released due to the shunting of relay 4RTR by the train. The opening of front contact *a* of relay 6WLPAR deenergizes relay 6WLSPR and the release of this latter relay completes, at its back contacts *a* and *b*, the energizing circuits for relays 6NWPSR and 6WLPR. Conditions in the field are now restored to normal. Opening of back contact *d* of relay 6NWPSR causes relay 6WLKR to release, thereby transmitting an indication to the office to release relay 6WLRK. This extinguishes lamp 6WLSKE to indicate to the operator that the switch lock has been restored to its normal condition.

It will now be assumed that, with the train having moved out of the siding onto the single track stretch, it proceeds westward to the west end of the stretch, the signals 5S and 2LA having been cleared for this train movement as previously described. As the train moves through section 4T, and then section 2T, the coded energy supplied from the east end of the stretch will follow the train, so that when the train moves out of section 2T at the west end of the stretch the code following track relay 2RTR will commence following the impulses of coded energy supplied to its winding. As a result, relays, 2RTFPR, 2RTBPR, and 2RHR will all be energized and their contacts picked up.

At this time, relay 2RFSPR functions to transmit a long impulse of steady energy from the west end of the stretch to the east end of the stretch. It will be seen from the drawings that at this time with relay 2RFSR having its contacts in their left-hand position, when contact *b* of relay 2RHR picks up, the stick circuit which energizes relay 2RFSPR over its front contact *b* will be interrupted, so that relay 2RFSPR releases. A circuit is then established including back contact *a* of relay 2RFSPR and normal contact *b* of relay 2RFSR for supplying energy to the winding of relay 2RCR as soon as the train vacates section 1T, as determined by the closing of front contact *a* of relay 1TR. With this portion of the circuit completed, during the next "off" period of the code being received at the west end of the stretch, back contact *a* of relay 2RTR closes the circuit for energizing relay 2RCR, which then picks up and maintains its contact *a* picked up to connect the battery 2RTB across the rails at the west end of section 2T, also disconnecting the winding of relay 2RTR from the section rails. Since relay 2RTR ceases its code following operation, relay 2RHR will release shortly thereafter and back contact *b* of this relay will again be closed in the circuit for relay 2RFSPR. However, with contact *b* of relay 2RFSPR released, energy is supplied to the winding of the thermal timing relay 2RFSTE, by the circuit which may be traced from terminal B at back contact *b* of relay 2RHR, over back contact *b* of relay 2RFSPR, and through the heater winding of the thermal relay to terminal N. The thermal relay is set to operate in some predetermined time interval, such as, for example, twelve seconds.

During this twelve-second interval, therefore, steady energy will be supplied at the west end of the stretch. During the next "off" interval of code transmitting relay 2LCR at the east end of section 2T, code following track relay 2LTR will pick up and maintain its contacts picked up to result in the transmission of steady energy through the next section from west to east. Thus it will be seen that the steady energy is cascaded, section by section, from the west to the east end of the stretch, at which location it causes relay 10LBKR to become picked up to transmit an indication code to the control machine which results in the energization of relay 10LBK in the machine.

When contact *d* of relay 10LBK picks up, the stick circuit for relay 6WLP is interrupted. With its pickup circuit already open, relay 6WLP is thus deenergized and releases, followed shortly thereafter by the release of the contacts of relay 6WLST.

This action results in an out-of-correspondence condition involving contacts of relays 6WLP and 6WLST in the circuits for energizing the starting relays for transmitting control codes to the two field locations. In addition, front contacts *e* and *f* of relay 6WLP which bypass contacts *d* and *e* of the traffic relay 2–10F will open, so that as a result control codes will be transmitted to both ends of the stretch to position the traffic relays thereat in accordance with the position of the traffic relay 2–10F.

With the contacts of relay 2–10F assumed to be in their right-hand position as shown in the drawings, and as originally described, traffic relay 2RFSR at the west end of the stretch will have its contacts positioned to their right-hand position, while at the east end of the stretch the contacts of relay 10LFSR will remain in their right-hand position. At the west end of the stretch, with contact *b* of relay 2RFSR in its right-hand position and contact *a* of relay 2RHSR in its left-hand or normal position, the circuit originally traced for supplying steady energy to the winding of relay 2RCR is again complete, so that steady energy is transmitted through the stretch from west to east as originally described, for eastward traffic direction.

As previously pointed out, the thermal relay 2RFSTE is set for a suitable time interval to permit the action described above to take place. At the expiration of this time interval, the contact *a* of relay 2RFSTE will close, thereby establishing a pickup circuit for the relay 2RFSPR. When the contacts of this relay pick up, front contact *b* establishes the stick circuit originally traced and back contact *b* deenergizes relay 2RFSTE.

The system is now restored to its original condition as shown in the drawings and as initially described.

The operation of the circuits for the condition wherein the train leaving the siding proceeds to the east end of the stretch instead of the west end, and the operation of the circuits when the traffic direction is initially westward, are essentially the same as that described above, and need not be described in detail.

I shall now describe the operation of the apparatus under the various conditions which occur when a train moving through the single track stretch is to move through the hand-operated switch governed by the electric switch lock and onto the siding.

It will be assumed that, with the traffic direction as shown for traffic movements from west to east, an eastbound train is to enter the stretch at the west end thereof and proceed through the stretch to the switch lock location, at which location it is to enter the siding. Accordingly, the control operator will clear the entering signals at the west end of the stretch in the manner previously described for a train movement through the stretch in the eastbound direction, the steady energy being removed at the left-hand end of the stretch and coded energy being supplied from the east end of the stretch through the various track sections to clear the intermediate signals and the entering head block signal. Additionally, the operator may reverse the switch lock lever 6WLO to transmit a control code to the field location 1–2 where the relay 6WLSR will be operated to its reverse position, whereupon an indication is transmitted to the control machine to energize relay 6WLSK, contact *b* of this relay extinguishing the indication lamp 6WLNKE over the switch control lever. The operator is thus informed that a switch unlock control has been stored at the field location.

With contact *a* of relay 6WLSR reversed, energy is supplied to the circuit including line wire 63 and back contact *a* of relay 6WLPAR for energizing relay 6WLSPR, so that the contacts of this relay pick up. No further circuit action takes place at the switch lock location or at the intermediate signal location 4S–5S where the major portion of the circuitry for the switch lock is located, until the train moves eastward through the stretch and passes signal 4S, the operation of the apparatus associated with the detector section 1T, and the track section 2T being similar to that previously described in connection with an eastbound train movement.

However, when the eastbound train passes signal location 4S–5S and shunts track section 4T, relay 4RTFPR will be released as a result of the release of track relay 4RTR. At signal location 6S–7S, relay 4LTFPR is already released, since relay 4LTR is not supplied with energy at this time, and a circuit is now established for energizing relay 6WLTPR at signal location 4S–5S. This circuit may be traced from terminal B at back contact *d* of relay 4LTFPR, over line wire 81, back contact *g* of relay 4RTFPR, back contact *e* of relay 6WLTER, front contact *e* of relay 6WLPR, through the winding of relay 6WLTPR, over line wire 83, and back contact *e* of relay 4LTFPR to terminal N. Accordingly, relay 6WLTPR will pick up, at which time its front contact *a* establishes a stick circuit for the relay which by-passes front contact *e* of relay 6WLPR and back contact *e* of relay 6WLTER.

When relay 6WLTPR picks up, its back contact *e* interrupts the stick circuit which supplies energy at this time to the winding of relay 6NWPSR, and this relay releases its contacts. Closing of back contact *c* of relay 6NWPSR establishes a circuit for energizing the time element relay 6WLTER, this circuit being traced from terminal B at front contact *a* of relay 6WLSPR, over front contact *b* of relay 6WLTPR, back contact *c* of relay 6NWPSR, and through the winding of relay 6WLTER to terminal N. Relay 6WLTER is a time element relay which is selected and arranged so that its contacts will pick up after the expiration of a predetermined time interval following the energization of the control winding of the relay. This time interval is selected so as to be at least as long as the time required for a train traveling at the lowest normal speed to progress from the farthest end of section 4T to the switch lock location. This insures that, following the entrance of the train into the section 4T, from either end, the time element relay will not have operated until the train has reached the vicinity of the switch lock 6WL. By this means, any train which is to enter the siding at this location will have arrived at that location before the switch lock circuits can be energized, and thus there is no possibility that a train already on the siding could accept the unlock and move out onto the main track before the train approaching on the single track stretch reaches the switch lock location.

When the train reaches the switch lock location, the trainman will operate the switch 6WLSW, with the result that relay 6WLPR will be released.

Assuming that the time element relay 6WLTER has operated through its timing cycle and its contacts are picked up, its front contact *a* establishes a stick circuit over back contact *c* of relay 6NWPSR to retain the time element relay energized. Additionally, a circuit for energizing relay 6WLSCR is completed at this time and may be traced from terminal B at front contact *a* of relay 6WLSPR, over back contact *a* of relay 6WLPR, front contact *c* of relay 6WLTPR, front contact *b* of relay 6WLTER, and through the winding of relay 6WLSCR to terminal N. It is to be noted that front contact *a* of relay 6WLTER and front contact *b* of relay 6WLTPR complete a second circuit from terminal B in multiple with front contact *a* of relay 6WLSPR. Front contact *b* of relay 6WLSCR now establishes a circuit including back contact *c* of relay 6SEPR for energizing the heater winding of the thermal time element relay SETER, which closes its front contact *b* after a short time interval to thereby energize relay 6SEPR which then picks up its contact *c* disconnecting the winding of the thermal relay and establishing a stick circuit for relay 6SEPR.

With relays 6WLSCR and 6SEPR picked up, a circuit is now established for energizing relays 6WLPAR and 6WLPBR, as previously traced, by the energy supplied over line wire 71 as a result of contact *a* of switch 6WLSW being closed. When relay 6WLPAR picks up, its front contact *b* establishes a stick circuit for that relay, and for relay 6WLPBR. With these relays picked up, the circuit traced before for energizing the switch lock magnet 6WLM is completed so that the locking dog is removed from the quadrant of the switch lock, allowing the switch lock to be operated to release the operating mechanism of the hand-throw switch. The train crew can now reverse the switch and the train can proceed into the siding.

When relays 6WLPAR and 6WLPBR pick up, the circuit for relay 6NWPR is interrupted, as previously explained, and this latter relay releases. Closing of back contact *a* of relay 6NWPR establishes a circuit for energizing relay 6WLKR, this circuit also including front contact *d* of relay 6WLTPR, back contact *d* of relay 6NWPSR, and wire 65. The pickup of relay 6WLKR causes an indication code to be transmitted to the control machine where relay 6WLRK picks up. Front contact *b* of relay 6WLRK completes the circuit for energizing indication lamp 6WLSKE, and, if signal lever 2GLO has been restored to normal, front contact *c* of relay 6WLRK establishes the previously traced circuit for energizing relay 6WLP, which picks up and establishes the stick circuit for itself which includes back contact *d* of relay 10LBK. Relays 6WLP and 6WLST pick up in cascade, and as previously explained cause the transmission of control codes to the opposite ends of the stretch to position the traffic relays to their code-transmitting positions. Relay 10LFSR is already in this position, so that nothing occurs at the east end of the stretch to interfere with the code being transmitted westward through the stretch to the switch lock location.

At the west end of the stretch, relay 2RFSR has its contacts operated to their left-hand position, so that contact *b* of relay 2RFSR establishes the circuit for supplying coded energy to the winding of relay 2RCR. This results in coded energy being fed eastward over section 2T, so that track relay 2TR recurrently operates its contacts to thereby cause relays 2LTBPR, 4–5HR, and 2LSR to pick up, and relay 2LTFPR to remain picked up.

Coded energy is not supplied to the west end of section 4T at this time, since the circuit for relay 4RCR is interrupted by contact *c* of relay 6NWPR.

When the train moves into the siding and clears the insulated joints at the fouling point on the siding, its wheels and axles no longer shunt track section 4T.

The train crew then proceeds to restore the hand-operated switch to its normal position, to operate the switch lock to its normal position, and to operate the switch 6WLSW to its normal position. When the switch 6WLSW is restored to its normal position, relays 6WLPAR and 6WLPBR will be deenergized and the contacts of these relays will release.

Assuming that the control operator has been notified by the train crew that the train has entered the siding, or has observed the lighted indication of lamp 6WLSKE, he will have restored the switch lock lever 6WLO to its normal position and transmitted a control code which will result in relay 6WLSR at the west end of the stretch being operated to its normal position. With relay 6WLPAR released and relay 6WLSR normal, relay 6WLSPR is deenergized and releases. Relay 6NWPR will now be picked up by energy supplied over the line wires 75 and 73, since the contacts of the switch lock and the switch circuit controller are in their normal position. Also, a circuit is now completed for energizing relay 6WLPR when relay 6WLSPR releases its contact *b*. This circuit includes the back contact *b* of relay 6WLSPR and contact *d* of switch 6WLSW. When relay 6WLPR picks up, a circuit is established for energizing relay 6NWPSR, which circuit may be traced from terminal B at back contact *a* of relay 6WLSPR, over front contact *b* of relay 6NWPR, front contact *b* of relay 6WLPR, and through the winding of relay 6NWPSR to terminal N. Accordingly, contact *c* of relay 6NWPSR picks up to interrupt the supply of energy to the winding of relay 6WLTER which thereafter releases its contacts.

Also, when back contact *a* of relay 6WLPR opens, and contact *a* of relay 6WLSPR releases, the supply of energy to the winding of relay 6WLSCR is cut off and the contacts of this relay release, thereby causing the release of relay 6SEPR. Back contact *a* of relay 6SEPR is also closed in the control circuit for relay 6NWPSR, so that this circuit is restored to its normal condition as originally described.

The coded energy which was supplied to the rails of section 2T at the west end of the stretch, as described above, is now retransmitted to section 4T, since the circuit for relay 4RCR is now closed over front contact *c* of relay 6NWPR, and front contact *h* of relay 6NWPSR.

Since coded energy is now being supplied to both ends of section 4T, a "code fight" ensues, until one or the other of the two track relays becomes picked up during an "off" interval of the coded energy being supplied from the associated track battery, whereupon the code transmission from that end will be discontinued, and the coded energy will be supplied to the next section, where a similar "code fight" will occur, and so on until coded energy is finally received at one end or the other of the stretch.

It will be seen that either relay 2RFSPR or 10LFSPR will operate to cause transmission of steady energy from which ever end of the stretch receives the coded energy. This steady energy will be cascaded through the track sections to the opposite end of the stretch, to cause one of the block indication relays to be energized in the control machine, which is assumed to be relay 10LBK.

When contact *d* of relay 10LBK in the control machine picks up, it interrupts the stick circuit for energizing relay 6WLP, which relay therefore releases, followed shortly by the release of the relay 6WLST. As previously pointed out, the code starting circuits for the control machine include an out-of-correspondence circuit utilizing contacts of relays 6WLP and 6WLST, so that the sequential release of these relays at this time causes control codes to be transmitted to the field locations at each end of the single track stretch. With contacts *e* and *f* of relay 6WLP released, the traffic relays at the field locations are positioned in accordance with the position of the traffic relay 2–10F in the control machine, so that the direction of traffic will be set up in the single track stretch in accordance with the traffic direction as established by the position of the contacts of relay 2–10F. The system is thus restored to its initial condition, as shown in the drawings, with no train occupying the stretch and the direction of traffic movement set up for eastward movements.

The switch lock control circuits which form a portion of my invention are also arranged to take care of the condition in which the single track stretch is to be traversed by two trains traveling in the same direction, the first of which is to proceed directly through the stretch, and the second train is to move into the siding at the hand-throw switch location. The operation of the apparatus under such conditions will now be described.

Assuming that two east bound trains are to proceed through the stretch, the control operator will proceed to operate signal lever 2GLO to its right-hand position and transmit a control code to the west or left-hand end of the stretch, which, in the manner previously described, causes the steady energy to be removed from that end of the stretch, and this removal of steady energy results in the transmission of coded energy from the east end of the stretch to clear the intermediate signals and to clear the entering head block signal at the west end of the stretch. It will also be assumed that the control operator positions the switch lock lever 6WLO to its reverse position so that the control code causes relay 6WLSR at the west end of the stretch to be reversed, thereby resulting in the picking up of relay 6WLSPR at signal location 4S–5S.

The movement of the train past the entering signal and through sections 1T and 2T causes the apparatus to operate in the manner previously described, and a detailed description of the operation of the equipment for this portion of the train movement is deemed unnecessary.

When the first eastbound train enters section 4T, the relay 6WLTPR will be picked up as a result of the closing of back contact *g* of relay 4RTFPR, indicating that section 4T has been occupied by a train. When relay 6WLTPR picks up, its back contact *e* interrupts the stick circuit for energizing relay 6NWPSR, deenergizing this latter relay since contact *a* of relay 6WLSPR is also picked up at this time. Accordingly, relay 6NWPSR will release its contacts and the circuit previously traced for energizing relay 6WLTER, including back contact *c* of relay 6NWPSR is completed with the result that relay 6WLTER begins its cycle of operation.

Since the first train is not destined for movement into the side track at the switch lock location, it proceeds past this location without further operation of the apparatus located at the switch lock location, so that relay 6WLPR is maintained energized over the circuit including its front contact *d* and front contact *b* of relay 6WLSPR. As a result, even if relay 6WLTER completes its cycle of operation and picks up its contacts, the circuit previously traced for energizing relay 6WLSCR is not closed, since this circuit is interrupted at back contact *a* of relay 6WLPR.

Assuming now that the first eastbound train vacates section 4T, it is necessary to provide some means for supplying steady energy to the rails of section 4T in order to cause relay 6WLTPR to become released to restore the circuits to their normal condition to permit the clearing of signals 2RA and 4S to allow the second train to enter the stretch. Since back contact *e* of relay 6WLTPR has the circuit for relay 6NWPSR interrupted, because contact *a* of relay 6WLSPR is picked up at this time, front contact *h* of relay 6NWPSR is open in the circuit for controlling the code transmitting relay 4RCR at signal location 4S–5S. However, this contact is bridged by the front contact *d* of the time element relay 6WLTER. As previously pointed out, this relay commenced its operating cycle when the train entered section 4T, but it will be assumed that the train is moving at a sufficient speed that it has vacated the section before the contacts of this relay have had sufficient time to pick up. When the operating time for relay 6WLTER is completed, the contacts of the relay pick up and front contact *d* establishes the circuit for supplying steady energy to the winding of relay 4RCR, with the result that steady energy is transmitted eastward over the rails of section 4T, resulting in the picking up of relay 4LTR at the signal location 6S–7S, and the consequent energization of relay 4LTFPR, whose back contacts *d* and *e* interrupt the circuit for supplying energy to the winding of relay 6WLTPR, which relay then releases its contacts.

When contact *e* of relay 6WLTPR releases, a circuit is established for energizing relay 6NWPSR, which circuit may be traced from terminal B at front contact *c* of relay 6WLTER, over front contact *c* of relay 6WLPR, back contact *e* of relay 6WLTPR, front contact *b* of relay 6NWPR, front contact *b* of relay 6WLPR in multiple with back contact *a* of relay 6SEPR, and through the winding of relay 6NWPSR to terminal N. When relay 6NWPSR picks up, its front contact *e* establishes a stick circuit for the relay which bridges the contacts of relays 6WLPR and 6WLTER, so that relay 6NWPSR remains picked up after relay 6WLTER releases, which release is brought about by the opening of the control circuit for relay 6WLTER at back contact *c* of relay 6NWPSR.

Front contact *h* of relay 6NWPSR now closes in the circuit for controlling relay 4RCR, so that the subsequent release of front contact *d* of relay 6WLTER will not interrupt the supply of steady energy to the rails of section 4T. The track circuit apparatus is now in proper condition to cause the operation of the coded wayside signaling apparatus to transmit coded energy through the sections to clear the signals for the following train when the train enters the single track stretch at the west end thereof. Additionally, front contact *b* of relay 6NWPSR is now picked up, so that when coded energy is received at signal location 4S–5S from section 4T, the wayside signal 4S can display a yellow or green aspect to permit the second eastbound train to move into section 4T and enter the side track at switch lock location 6WL in the manner previously described.

A further feature of my invention is the provision of novel and improved means for supplying an indication to the control operator that the source of primary power at a power switch location has failed, so that the apparatus located thereat is dependent upon standby power. Such an indication is provided by utilization of the normal and reverse switch indication channels in the code system, in such manner that if the power fails while a switch is in its normal locked position, both the normal and reverse indication channels of the code communication system are energized, to transmit an indication to the control machine. In the control machine, the reverse switch indication relay is governed by a back contact of the normal switch indication relay, so that the reverse switch indication relay can only be energized if the normal switch indication relay is released. An additional power-off indication relay is provided, and the circuits are arranged so that, when both of the indication channels are energized due to a power-off condition with the switch movement in its normal locked position, the normal switch indication relay will be picked up but the reverse switch indication relay will remain released since its control circuit is opened by the back contact of the normal switch indication relay. However, since the reverse switch indication channel is energized at this time, an additional circuit is provided including a contact of the normal switch indication relay for picking up the power-off indication relay. A stick circuit is provided for the power-off indication relay so that the power-off indication will persist even though the switch may later be operated to its reverse position.

After the power-off condition has been relieved at the field location, the first normal switch indication code transmitted from that location will cause the release of the power-off indication relay. The operation can be readily understood from the following description of the power-off indication circuits associated with the location at the west end of the single track stretch.

Front contact *b* of relay 1NWCR governs the supply of energy to terminal 17 of the field unit 1–2, in such manner that, when front contact *b* of relay 1NWCR is picked up, relay 1NWK at the control office will also be energized and its contacts picked up. Front contact *b* of reverse switch correspondence relay 1RWCR governs the supply of energy to terminal 15 of the field unit 1–2, and is connected through the code communication system to terminal 15 of the office unit, where it supplies energy to the reverse switch indication relay 1RWK, in a manner to be subsequently described, and additionally supplies energy to the power-off indication relay 1POK by a circuit which will be described in detail later. It will also be noticed that back contact *b* of relay 1RWCR is connected to back contact *c* of relay 1POR, in such manner that, with relay 1NWCR energized, and relay 1POR deenergized, energy is supplied to both terminals 15 and 17 of the field unit 1–2.

In the control machine, terminal 17 is connected to the winding of relay 1NWK over front contact *b* of the delivery relay 1–2D, a stick circuit being provided for this relay over the back contact *b* of relay 1–2D and front contact *a* of relay 1NWK. Front contact *b* of relay 1NWK supplies energy to the normal switch indication lamp 1NKE.

Terminal 15 in the control machine is connected to the winding of relay 1RWK by a circuit including front contact *d* of the delivery relay 1–2D, and is also governed by a back contact *c* of relay 1NWK, so that relay 1RWK can be energized only when relay 1NWK is released. The usual stick circuit including front contact *a* of relay 1RWK is provided to maintain this relay energized after having once been picked up by a reverse switch indication from the field location. Front contact *b* of relay 1RWK governs the supply of energy to the reverse switch indication lamp 1RKE.

Terminal 15 also supplies energy to the winding of the power-off indication relay 1POK, by a circuit which includes front contact *c* of relay 1–2D, and front contact *d* of relay 1NWK. The stick circuit for relay 1POK includes front contact *a* of relay 1POK, and either back contact *c* of relay 1–2D and front contact *d* of relay 1NWK or back contact *d* of relay 1NWK. Front contact *b* of relay 1POK governs the supply of energy to the power-off indication lamp 1POKE.

As shown, with the switch 1W in its normal position, relay 1NWCR is picked up, with the result that relay 1NWK in the control machine is energized to thereby light the normal switch indication lamp. If the switch 1W is reversed, relay 1NWCR will release and relay 1RWCR will pick up, so that relay 1NWK in the control machine is released to extinguish the normal indication lamp, and relay 1RWK will be picked up by the circuit including back contact *c* of relay 1NWK, with the result that the reverse switch indication lamp is lighted.

It will now be assumed that, with the switch in its normal position, a failure of alternating current energy supplied to the primary winding of transformer PT occurs which causes relay 1POR to release its contacts. Contacts *a* and *b* of this relay transfer the signal lighting circuits for the signals at this location to the storage battery LB to maintain the lighting energy for the signals. Back contact *c* of relay 1POR establishes a circuit including front contact *b* of relay 1NWCR, and back contact *b* of relay 1RWCR for supplying energy to both terminals 15 and 17 of the field unit 1–2. As a result, in the control office, relay 1NWK will remain picked up and relay 1RWK will remain released, since relay 1NWK maintains the circuit for relay 1RWK open at back contact *c*. Energy is now supplied to the winding of relay 1POK from terminal 15, over front contact *c* of relay 1–2D, and front contact *d* of relay 1NWK, so that relay 1POK picks up to thereby light the power-off indication lamp 1POKE. Relay 1POK remains picked up at this time when the delivery relay 1–2D releases at the end of the indication code, the stick circuit being completed over front contact *a* of relay 1POK, back contact *c* of relay 1–2D, and front contact *d* of relay 1NWK. Thus the operator is advised of a power-off condition at the field location at the west end of the stretch. It will be noted that the normal switch indication is retained at this time.

If the switch 1W is now reversed by the operator, relay 1NWCR will be released and relay 1RWCR will be picked up. Accordingly, no energy is supplied to terminal 17 of the field unit but energy is supplied to terminal 15, so that the indication code will cause relay 1NWK to release its contacts, thereby permitting relay 1RWK to pick up. Since energy is supplied to terminal 15, relay 1POK will be maintained energized while contact *d* of relay 1NWK is picked up. When this contact *d* releases, a stick circuit for maintaining relay 1POK energized is completed over back contact *d* of relay 1NWK. As a result, the normal switch indication lamp is extinguished and the reverse switch indication lamp is lighted, while the power-off indication lamp remains lighted.

It will now be assumed that, with the switch in its normal position, the supply of power is restored at the field location at the west end of the stretch, so that the contacts of relay 1POR pick up. Accordingly, an indication code is transmitted to the office which will hold up the contacts of relay 1NWK, since energy is supplied to terminal 17. With relay 1RWCR released in the field and relay 1POR picked up, no energy is supplied to terminal 15 at this time, and as a result relay 1POK is not supplied with energy over the pickup circuit including front contact *c* of relay 1–2D and front contact *d* of relay 1NWK. Relay 1POK will thus release to extinguish the power-off indication lamp.

It will thus be seen that this arrangement provides for superimposing a power-off indication upon the usual switch indication code channels, and additionally provides for retaining the power-off indication when the track switch is operated from its normal to its reverse position while the power-off condition is still persisting.

From the foregoing, it will be seen that my invention provides a novel and improved railway signaling system of the type employing reversible track circuits, arranged to be supplied with steady or coded energy in accordance with the direction of traffic movement through the stretch and the conditions of occupancy of the stretch, which signaling system is governed from a central control point by means of a suitable communication system. In this system, novel features are incorporated in the arrangement for controlling hand-operated electrically locked switches in the single track stretch. These circuits provide for checking the presence of steady energy in the single track stretch before permitting any action to take place which would interfere with the operation of trains through the stretch and provide for making moves from the single track stretch into a siding through a hand-operated electrically locked switch by means of timing the occupancy of the track section in which the hand-throw switch is located. These circuits further utilize a minimum number of line wires extending between the switch lock location and the location of the control apparatus. Further features of novelty reside in the provision of separate track indication lamps in the control machine for separately indicating the presence of a train in approximately each half of the single track stretch. A further novel feature is the provision of an improved arrangement for providing a power-off indication which is superimposed on the indication channels normally used for providing switch indications, with provision being made for retaining the power-off indication when once received, despite subsequent operations of the switch, and without interfering with the regular switch indications.

Although I have herein shown and described only one form of railway signaling system embodying my invention, it is understood that various changes and modifications may be made therein within the scope of the appended claims without departing from the spirit and scope of my invention.

Having thus described my invention, what I claim is:

1. In a centralized traffic control system for a stretch of single track railway including a communication means for transmitting control functions from a control office to field stations at the ends of said stretch and indication functions from said stations to said office, said stretch being provided with a reversible track circuit means for indicating the position of a train in said stretch, said track circuit means being normally energized with steady energy fed through the rails from the established entrance end to the established exit end of the stretch, and means for replacing the steady energy by coded energy supplied from the established exit end when the stretch is conditioned for traffic movement therethrough, the combination comprising, a first track detection means at a first end of said stretch controlled by the track circuit means for detecting the occupancy of one portion of said stretch, a second track detection means at the second end of said stretch controlled by the track circuit means for detecting the occupancy of a second portion of said stretch, a first and a second block detection means at said first and said second ends respectively of said stretch and controlled by the track circuit means for detecting the reception of steady track energy at the corresponding end, a first indication means at the control office controlled through said communication means jointly by said first track detection means and said block detection means for supplying an indication of the occupied condition of said one portion of said stretch only when both block detection means detect the non-reception of steady track energy, and a second indication means at said control office controlled through said communication means jointly by said second track detection means and said block detection means for supplying an indication of the occupied condition of said second portion of said stretch only when both block detection means detect the non-reception of steady track energy.

2. In a centralized traffic control system for a stretch of single track railway including a communication means for transmitting control functions from a control office to field stations at the ends of said stretch and indication functions from said stations to said office, said stretch being provided with a reversible track circuit means for indicating the position of a train in said stretch, said track circuit means being normally energized with steady energy fed through the rails from the established entrance end to the established exit end of the stretch, and means for replacing the steady energy by coded energy supplied from the established exit end when the stretch is conditioned for traffic movement therethrough, the combination comprising, a first track detection means at a first end of said stretch controlled by the track circuit means for detecting the occupancy of one portion of said stretch, a second track detection means at the second end of said stretch controlled by the track circuit means for detecting the occupancy of a second portion of said stretch, a first and a second block detection means at said first and said second ends respectively of said stretch, each controlled by said track circuit means for detecting the reception of steady track energy at the corresponding end of said stretch, a first and a second track indication means at the control office controlled through said communication means by said first and said second track detection means respectively for recording the occupied and non-occupied conditions of the associated portion of said stretch as detected by the corresponding track detection means, a first and a second block indication means at said control office controlled respectively through said communication means by said first and said second block detection means for recording the reception and non-reception of steady track energy at the corresponding end of said stretch, and occupancy indication means at said office corresponding to each portion of said stretch and controlled by the corresponding track indication means and by both block indication means for displaying a track occupied indication when the corresponding track indication means records such an indication and both block indication means are recording the non-reception of steady track energy.

3. In a centralized traffic control system for a stretch of single track railway including a communication means for transmitting control functions from a control office to field stations at the ends of said stretch and indication functions from said stations to said office, said stretch being provided with a reversible track circuit means for indicating the position of a train in said stretch, said track circuit means being normally energized with steady energy fed through the rails from the established entrance end to the established exit end of the stretch, and means for replacing the steady energy by coded energy supplied from the established exit end when the stretch is conditioned for traffic movement therethrough, the combination comprising, a track detection means at a field station for a selected portion of said stretch controlled by the track circuit means for detecting the occupancy of said selected portion, a block detection means at each end of said stretch controlled by said track circuit means for detecting the reception of steady track energy at the corresponding end of said stretch, a track indication means at the control office controlled through said communication means by said track detection means for recording the occupied and non-occupied condition of said selected portion, a block indication means at said control office controlled through said communication means by each block detection means for recording the reception and non-reception of steady track energy at the corresponding end, and occupancy indication means at said office controlled by said track indication means and by both block indication means for displaying an occupied indication for said selected portion when said track indication means records such an indication and both block indication means are recording the non-reception of steady track energy.

4. In a centralized traffic control system for a stretch of single track railway including a communication means for transmitting control functions from a control office to field stations at the ends of said stretch and indication functions from said stations to said office, said stretch being provided with entering signals at each end and a reversible track circuit means for controlling the aspect displayed by the entering signals, said track circuit means being normally energized with steady energy fed through the rails from the established entrance end to the established exit end of the stretch, and means for replacing the steady energy by coded energy supplied from the established exit end when an entering signal is cleared for traffic movement through the stretch, the combination comprising, a first track detection means at a first end of said stretch controlled by the track circuit means for detecting the occupancy of one portion of said stretch, a second track detection means at the second end of said stretch controlled by the track circuit means for detecting the occupancy of a second portion of said stretch, a first and a second block detection means at said first and said second ends respectively of said stretch, each controlled by said track circuit means for detecting the reception of steady track energy at the corresponding end of said stretch, a first and a second track indication means at the control office controlled through said communication means by said first and said second track detection means respectively for recording the occupancy condition detected by the corresponding track detection means, a first and a section block indication means at said office controlled through said communication means by said first and said second block detection means for recording the reception and non-reception of steady track energy at the corresponding end of said stretch, occupancy indicating means at said office jointly controlled by both said track indication means and by both said block indication means for displaying an individual indication of the occupancy of the portions of said stretch when the corresponding track indication means records occupancy only if both block indication means record the non-reception of steady track energy at both ends, and a lockout means at said office having connections to said occupancy indicating means and responsive to the transmission of a control function to clear an entering signal at either end of said stretch when the reception of steady track energy is recorded in the block indication means corresponding to the previously established exit end for interrupting the display of any occupancy indication until the steady track energy is replaced by coded track energy.

5. In a centralized traffic control system of a single track railway including a communication means for transmitting control functions from a control office to field stations at the ends of said stretch and indication functions from said stations to said office, said stretch being provided with entering signals at each end and a reversible track circuit means for controlling the aspect displayed by the entering signals, said track circuit means being normally energized with steady energy fed through the rails from the established entrance end to the established exit end of the stretch, and means for replacing the steady energy by coded energy supplied from the established exit end when an entering signal is cleared for traffic movement through the stretch, the combination comprising, a first track detection means at a first end of said stretch controlled by the track circuit means for detecting the occupancy of one portion of said stretch, a second track detection means at the second end of said stretch controlled by the track circuit means for detecting the occupancy of a second portion of said stretch, a first and a second block detection means at said first and said second ends respectively of said stretch, each controlled by said track circuit means for detecting the reception of steady energy at the corresponding end of said stretch, a first and a second track indication means at the control office controlled through said comunication means by said first and said second track detection means respectively for recording the occupancy condition detected by the corresponding track detection means, a first and a second block indication means at said office controlled through said communication means by said first and said second block detection means for recording the reception and non-reception of steady track energy at the corresponding end of said stretch, occupancy indicating means at said office jointly controlled by both said track indication means and by both said block indication means for displaying an individual indication of the occupancy of the portions of said stretch when the corresponding track indication means records occupancy only if both block indication means record the non-reception of steady track energy at both ends, and a lockout means at said office having connections to said occupancy indicating means and responsive to the transmission of control functions to reverse the established direction of traffic when the reception of steady track energy is recorded in the block indication means corresponding to the established exit end for interrupting the display of any occupancy indication until the steady track energy is replaced by coded track energy.

References Cited in the file of this patent

UNITED STATES PATENTS

| | | |
|---|---|---|
| 2,107,163 | Preston | Feb. 1, 1938 |
| 2,344,333 | Van Horn | Mar. 14, 1944 |
| 2,460,336 | Cadman | Feb. 1, 1949 |
| 2,460,337 | Young | Feb. 1, 1949 |
| 2,552,862 | Pascoe | May 15, 1951 |
| 2,561,956 | Staples | July 24, 1951 |
| 2,635,182 | Judge | Apr. 14, 1953 |
| 2,638,535 | Young | May 12, 1953 |
| 2,647,987 | Failor et al. | Aug. 4, 1953 |

UNITED STATES PATENT OFFICE

CERTIFICATE OF CORRECTION

Patent No. 2,954,463

September 27, 1960

Clifford D. Ihrig

It is hereby certified that error appears in the printed specification of the above numbered patent requiring correction and that the said Letters Patent should read as corrected below.

Column 43, line 16, for "section" read -- second --; line 36, after "system" insert -- for a stretch --; same line, before "single" strike out -- a --.

Signed and sealed this 11th day of April 1961.

(SEAL)
Attest:

ERNEST W. SWIDER
Attesting Officer

ARTHUR W. CROCKER
Acting Commissioner of Patents